(12) United States Patent
Maeda et al.

(10) Patent No.: US 8,858,811 B2
(45) Date of Patent: Oct. 14, 2014

(54) METHOD FOR MANUFACTURING A MIRROR DEVICE BY MEANS OF A PLURALITY OF SACRIFICIAL LAYERS

(75) Inventors: Yoshihiro Maeda, Tokyo (JP); Fusao Ishii, Menlo Park, CA (US); Kazuhiro Watanabe, Tokyo (JP); Hirotoshi Ichikawa, Tokyo (JP)

(73) Assignee: Fred Ishii, Pittsburgh, PA (US)

( * ) Notice: Subject to any disclaimer, the term of this patent is extended or adjusted under 35 U.S.C. 154(b) by 1241 days.

(21) Appl. No.: 12/381,587

(22) Filed: Mar. 12, 2009

(65) Prior Publication Data

US 2009/0206052 A1    Aug. 20, 2009

Related U.S. Application Data

(63) Continuation-in-part of application No. 11/894,248, filed on Aug. 18, 2007, now Pat. No. 7,835,062, and a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/069,245, filed on Mar. 13, 2008, provisional application No. 60/841,173, filed on Aug. 30, 2006.

(51) Int. Cl.
*B29D 11/00* (2006.01)
*G02B 26/08* (2006.01)

(52) U.S. Cl.
CPC .................................. *G02B 26/0833* (2013.01)
USPC ........ 216/24; 216/2; 216/41; 216/58; 216/67; 438/689; 438/706; 438/710

(58) Field of Classification Search
USPC ........ 438/689, 706, 710; 216/224, 41, 58, 67, 216/2, 24
See application file for complete search history.

(56) References Cited

U.S. PATENT DOCUMENTS

| | | | |
|---|---|---|---|
| 5,425,845 A | 6/1995 | Wong | |
| 5,817,569 A | 10/1998 | Brenner et al. | |
| 5,936,760 A | 8/1999 | Choi et al. | |
| 6,063,696 A | 5/2000 | Brenner et al. | |
| 6,172,797 B1 * | 1/2001 | Huibers | 359/291 |
| 6,583,920 B2 | 6/2003 | Yoon et al. | |
| 6,686,291 B1 | 2/2004 | Hortaleza | |
| 6,753,037 B2 | 6/2004 | Miller et al. | |
| 6,787,054 B2 | 9/2004 | Wang et al. | |
| 6,787,187 B2 | 9/2004 | Jacobs | |
| 6,815,361 B1 | 11/2004 | Bae et al. | |
| 6,849,471 B2 | 2/2005 | Patel et al. | |
| 6,906,845 B2 | 6/2005 | Cho et al. | |

(Continued)

*Primary Examiner* — Shamin Ahmed
(74) *Attorney, Agent, or Firm* — Bo-In Lin

(57) ABSTRACT

A method for manufacturing a device comprising an elastic member on a substrate includes steps of: forming a sacrificial layer by forming a plurality of sacrificial sub-layers on the substrate; forming a plate member in or on the sacrificial layers connected to the substrate and substantially parallel to a top surface of the substrate; and removing the sacrificial sub-layers after forming the plate member by removing the sacrificial sub-layers in an order different from the reverse order of forming the sacrificial sub-layers.

43 Claims, 19 Drawing Sheets cross section AA'

(56) References Cited

U.S. PATENT DOCUMENTS

| | | |
|---|---|---|
| 6,958,123 B2 | 10/2005 | Reid et al. |
| 6,960,305 B2 | 11/2005 | Doan et al. |
| 7,138,693 B2 | 11/2006 | Patel et al. |
| 7,153,443 B2 | 12/2006 | Doan et al. |
| 2002/0196524 A1* | 12/2002 | Huibers et al. ............ 359/291 |
| 2005/0206993 A1 | 9/2005 | Doan et al. |

* cited by examiner

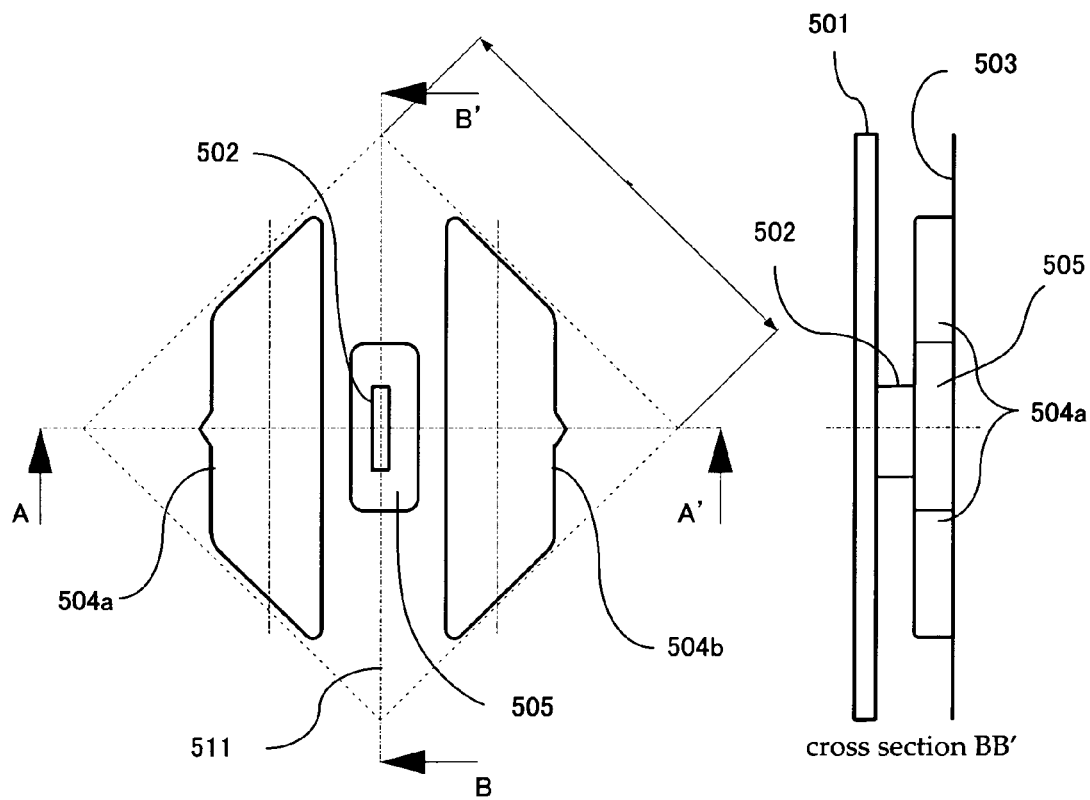
FIG. 5A
FIG. 5C
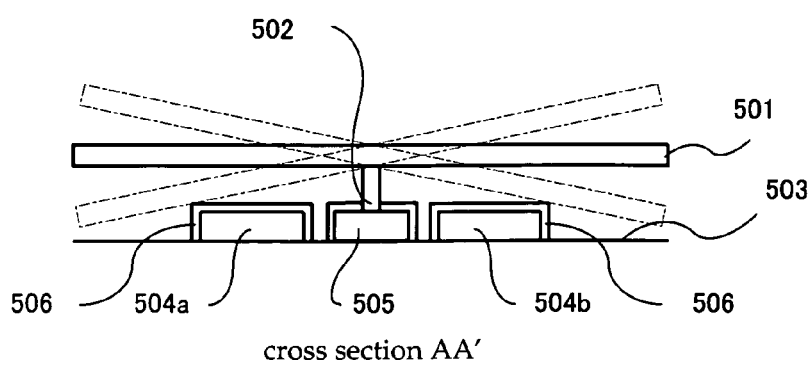
FIG. 5B cross section XX' cross section YY'

METHOD FOR MANUFACTURING A MIRROR DEVICE BY MEANS OF A PLURALITY OF SACRIFICIAL LAYERS

CROSS REFERENCE OF RELATED APPLICATIONS

This application is a Non-provisional Application of a Provisional Application 61/069,245 filed on Mar. 13, 2008 and a Continuation in Part Application of another patent application Ser. No. 11/894,248 filed on Aug. 18, 2007 now issued into U.S. Pat. No. 7,835,062. The application Ser. No. 11/894, 248 is a Non-provisional Application of a Provisional Application of 60/841,173 filed on Aug. 30, 2006. This Application is further a Continuation in Part (CIP) Application of a Non-provisional patent application Ser. No. 11/121,543 filed on May 4, 2005 issued into U.S. Pat. No. 7,268,932 and another Non-provisional application Ser. No. 10/698,620 filed on Nov. 1, 2003. The application Ser. No. 11/121,543 is a Continuation In Part (CIP) Application of three previously filed Applications. These three Applications are Ser. No. 10/698, 620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to the manufacturing of a mirror device (also known as a "digital micromirror device" or "micromirror device") provided for a projection device and particularly to a method for manufacturing a mirror device by means of a plurality of sacrificial layers.

2. Description of the Related Arts

Even though there have been significant advances made in recent years in the technology of implementing electromechanical micromirror devices as spatial light modulators (SLM), there are still limitations and difficulties when these are employed to display high quality images. Specifically, when the display images are digitally controlled, the quality of the images is adversely affected because the images are not displayed with a sufficient number of gray scale gradations.

Electromechanical mirror devices are drawing a considerable amount of interest as spatial light modulators (SLM). The electromechanical mirror device consists of a mirror array arranging a large number of mirror elements. In general, the number of mirror elements range from 60,000 to several millions and are arranged on the surface of a substrate in an electromechanical mirror device.

Refer to FIG. 1A for a digital video system 1 as disclosed in relevant U.S. Pat. No. 5,214,420, which includes a display screen 2. A light source 10 is used to generate light energy to illuminate display screen 2. Light 9 is further concentrated and directed toward lens 12 by mirror 11. Lens 12, 13, and 14 serve a combined function as a beam columnator to direct light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes switchable reflective elements, e.g., micro-mirror devices 32 with elements 17, 27, 37, and 47 as reflective elements attached to a hinge 30, as shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

Each of the mirror elements constituting a mirror device functions as a spatial light modulator (SLM), and each mirror element comprises a mirror and electrodes. A voltage applied to the electrode(s) generates a Coulomb force between the mirror and the electrode(s), making it possible to control and incline the mirror. The inclined mirror is "deflected" according to a common term used in this patent application for describing the operational condition of a mirror element.

When a mirror is deflected with a voltage applied to the electrode(s), the deflected mirror also changes the direction of the reflected light in reflecting an incident light. The direction of the reflected light is changed in accordance with the deflection angle of the mirror. The present patent application refers to the light reflected to a projection path designated for image display as "ON light", and refers to a light reflected in a direction away from the designated projection path for image display as "OFF light". When only a portion of the reflected light is directed in the ON light direction and the light reflected by the mirror to the projection path is of lesser intensity than the "ON light", it is referred to as "intermediate light".

The present patent application defines an angle of rotation along a clockwise (CW) direction as a positive (+) angle and that of a counterclockwise (CCW) direction as a negative (−) angle. A deflection angle is defined as zero degrees (0°) when the mirror is in the initial state.

The on-and-off states of a micromirror control scheme, such as that implemented in the U.S. Pat. No. 5,214,420 and by most conventional display systems, limit image display quality. This is because the application of a conventional control circuit limits the gray scale (PWM between ON and OFF states) by the LSB (least significant bit, or the least pulse width). Due to the ON-OFF states implemented in conventional systems, there is no way to provide a pulse width shorter than the LSB. The least brightness, which determines the gray scale, is the light reflected during the least pulse width. A limited gray scale leads to lower image quality.

In FIG. 1C, a circuit diagram of a control circuit for a micro-mirror according to U.S. Pat. No. 5,285,407 is presented. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the Static Random Access switch Memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The mirror is driven by a voltage applied to the landing electrode and is held at a predetermined deflection angle on the landing electrode. An elastic "landing chip" is formed on the portion of the landing electrode that comes into contact with the mirror, and assists in deflecting the mirror towards the opposite direction when the deflection of the mirror is switched. The landing chip is designed to have the same potential as the landing electrode so that a shorting is prevented when the landing electrode is in contact with the mirror.

Each mirror formed on a device substrate has a square or rectangular shape, and each side has a length of 4 to 15 um. In this configuration, a portion of the reflected light is reflected not from the mirror surface but from the gaps between the mirrors or other surfaces of the mirror device. These "unintentional" reflections are not applied to project an image and are inadvertently generated. The contrast of the displayed image is degraded due to the interference from these unintentional reflections generated by the gaps between the mirrors. In order to overcome this problem, the mirrors are arranged on a semiconductor wafer substrate with a layout to minimize the gaps between the mirrors. One mirror device is generally designed to include an appropriate number of mirror elements, wherein each mirror element is manufactured as a deflectable mirror on the substrate for displaying a pixel of an image. The appropriate number of elements for displaying an image is configured in compliance with the display resolution standard according to the VESA Standard defined by the Video Electronics Standards Association or by television broadcast standards. When a mirror device is configured with the number of mirror elements in compliance with WXGA (resolution: 1280 by 768) defined by VESA, the pitch between the mirrors of the mirror device is 10 μm, and the diagonal length of the mirror array is about 0.6 inches.

The control circuit, as illustrated in FIG. 1C, controls the mirrors to switch between two states, and the control circuit drives the mirror to oscillate to either an ON or OFF deflected angle (or position) as shown in FIG. 1A.

The minimum intensity of light reflected from each mirror element for image display, i.e., the resolution of gray scale of image display for a digitally-controlled image display apparatus, is determined by the least length of time that the mirror may be controlled to stay in the ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits, where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analogous levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has n bit-planes. Then, each bit-plane has a 0 or 1 value for each display element. According to the PWM control scheme as described in the preceding paragraphs, each bit-plane is separately loaded and the display elements are controlled on the basis of bit-plane values corresponding to the value of each bit within one frame. Specifically, the bit-plane according to the LSB of each pixel is displayed for 1 time period.

When adjacent image pixels are shown with a great degree of difference in the gray scales, due to a very coarse scale of controllable gray scale, artifacts are shown between these adjacent image pixels. That leads to image degradations. The image degradations are especially pronounced in the bright areas of display, where there are "bigger gaps" between gray scales of adjacent image pixels. The artifacts are generated by technical limitations in that the digitally controlled display does not provide sufficient gray scales. Thus, in the bright areas of the display, the adjacent pixels are displayed with visible gaps of light intensities.

As the micromirrors are controlled to have a fully on and fully off position, the light intensity is determined by the length of time the micromirror is at the fully on position. In order to increase the number of gray scales of a display, the speed of the micromirror must be increased such that the digital control signals can be increased to a higher number of bits. However, when the speed of the micromirrors is increased, a stronger hinge is necessary for the micromirror to sustain the required number of operational cycles for a designated lifetime of operation, In order to drive micromirrors supported on a stronger hinge, a higher voltage is required. In this case, the voltage may exceed twenty volts and may even be as high as thirty volts. Micromirrors manufactured by applying the CMOS technologies would probably not be suitable for operation at this higher range of voltages, and therefore, DMOS micromirror devices may be required. In order to achieve a higher degree of gray scale control, more complicated manufacturing processes and larger device areas are necessary when DMOS micromirrors are implemented. Conventional modes of micromirror control are therefore facing a technical challenge in that the gray scale accuracy has to be sacrificed for the benefits of a smaller and more cost effective image display system, due to the operational voltage limitations.

There are many patents related to light intensity control. These Patents include U.S. Pat. Nos. 5,589,852, 6,232,963, 6,592,227, 6,648,476, and 6,819,064. There are further patents and patent applications related to different shapes of light sources. These Patents includes U.S. Pat. Nos. 5,442,414 and 6,036,318 and Application 20030147052. U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed or provided direct resolution for a person of ordinary skill in the art to overcome the limitations and difficulties discussed above.

In order to address the above problems, US Patent Application 20050190429 discloses a method for controlling the deflection angle of the mirror to express higher gray scales of an image. In this disclosure, the intensity of light produced during the oscillation period of mirror is between 25% to 37% of the intensity of light produced when the mirror is held in the ON position continuously.

According to such a control, it is not necessary to drive the mirror at a high speed. Thus, it is possible to provide higher gray scales using a hinge, which supports the mirror, with a low elastic constant. Hence, it is possible reduce the voltage applied to the electrode.

FIGS. 3A and 3B are cross-sectional views, taken along line II-II, of the single mirror element of the mirror device 200 shown in FIG. 2. The operation of the single mirror element 300 will be described below.

The single mirror element 300 comprises a mirror 302, an elastic hinge 304 for supporting the mirror, address electrodes 307a and 307b, and two memory cells, a first and second memory cell, for applying voltage to the address electrodes 307a and 307b such that the mirror 302 is controlled to be in a desired deflection state. A drive circuit and wiring (not shown) of each of the memory cells are usually provided inside the device substrate 303. The deflection direction of the mirror 302 can be controlled by controlling each of the memory cells with the signal of image data. Incident light can be modulated and reflected by the mirror 302 in its various deflection states.

FIG. 3A is a cross-sectional view of the mirror element 300 deflecting the mirror 302 to reflect incident light towards a projection optical system.

By supplying the memory cell with a signal (0, 1), a voltage of 0 [V] is applied to the address electrode 307a, and a voltage of Va [V] is applied to the address electrode 307b. As a result, the mirror 302 in the horizontal state is deflected by the Coulomb force in the direction of the address electrode 307b to which Va [V] is applied. This causes the mirror 302 to reflect incident light emitted from a light source 301 towards the projection optical system (ON light state). An insulating layer 306 is provided on the device substrate 303, and the hinge electrode 305 connected to the elastic hinge 304 is connected to the ground through a via-connector (not shown) provided on the insulating layer 306.

FIG. 3B is a cross-sectional view of the mirror element 300 deflecting the mirror 302 so as not to reflect incident light towards the projection optical system.

By supplying the memory cell with a signal (1, 0), voltage of Va [V] is applied to the address electrode 307a and voltage of 0 [V] is applied to the address electrode 307b. As a result, the mirror 302 in the horizontal state is deflected by the Coulomb force in the direction of the address electrode 307a to which Va [V] is applied. This causes incident light to be reflected in a direction other than the direction of a light path leading to the projection optical system (OFF light state).

FIGS. 4A through 4F are diagrams showing the outline of the manufacturing process of the mirror element 300 shown in FIGS. 3A and 3B above.

First, in FIG. 4A, an n-type or p-type impurity is infused to form a drive circuit, such as a transistor, into a semiconductor wafer substrate 303, in order to drive and control the mirror. Then, the hinge electrode 305 and address electrodes 307 (307a and 307b), connected to wiring (not shown) and the drive circuit, are formed on the semiconductor wafer substrate 303. An insulating layer 306 is formed on the semiconductor wafer substrate 303, the hinge electrode 305, and the address electrodes 307.

Next, in FIG. 4B, a sacrificial layer 401 is deposited on the insulating layer 306. The sacrificial layer 401 is used to maintain space between the undersurface of the mirror 302, formed in a later process, and the semiconductor wafer substrate 303. The thickness of the sacrificial layer 401 determines the height of the elastic hinge 304 supporting the mirror 302.

In FIGS. 4C and 4D, a portion of the sacrificial layer 401 is removed by etching, such that an opening is made. An elastic member to serve as the elastic hinge 304 is deposited in the opening. Additionally, the deposited elastic member is etched to obtain a desired shape for the elastic hinge. Then, the sacrificial layer 401 is polished until the surface of the elastic member is exposed.

In FIG. 4E, a mirror layer 402 is deposited in such a way that it is connected to the top surfaces of the sacrificial layer 401 and the elastic member 304.

In FIG. 4F, the mirror layer 402 is formed into the desired mirror shape by etching. Then, the entirety of the sacrificial layer 401 is removed by etching, in order to form the space in which a mirror can deflect. This completes the manufacturing process of a mirror element.

An inorganic-glass sacrificial layer can be formed using a method for depositing a material, such as $SiH_4$ and $O_2$, by means of a chemical vapor deposition (CVD) method or by using a coating method in which glass, such as solution layer PSG, is spin-coated. Since the inorganic-glass sacrificial layer formed with these methods has a hard surface, it can be polished. A mirror layer can be formed on the polished surface. The mirror layer is flat and almost uniform. However, in the process of removing a sacrificial layer, water is generated when the sacrificial layer is removed using vapor-phase hydrogen fluoride (HF) as an etchant. Water between the mirror 302 and the electrodes 307 may generate surface tension, intermolecular force, etc., causing the mirror 302 supported by the elastic member to deflect and adhere to the electrodes 307. In the manufacturing process, this phenomenon, known as stiction, can occur.

It is necessary for the mirror 302 and electrodes 307 to have conductivity. The mirror 302 is formed of a highly reflective material such as aluminum, gold, or silver. When the mirror 302 deflects towards the electrode 307, an electrical short occurs at the point of contact between the mirror 302 and electrode 307. In order to prevent the short from occurring, the insulating layer 306, composed of an oxidized compound, such as silicon dioxide ($SiO_2$), covers and protects the surface of the electrode. However, since the insulating layer 306 has weak acid-resistance to hydrogen fluoride (HF) as an etchant, used in removing the sacrificial layer 401, the insulating layer 306 is also removed together with the sacrificial layer 401.

In addition, the insulating layer, acting as a protection film, is too thin at the base of the electrode 307. Therefore, when hydrogen fluoride (HF) is used as an etchant for removing the sacrificial layer, it easily penetrates to the inside of the semiconductor wafer substrate. This causes defects such as the removal of even silicon dioxide ($SiO_2$), which is an insulating film inside the substrate.

The following are patent documents relate to the technology of manufacturing a conventional mirror device.

U.S. Pat. No. 6,906,845 discloses a technology of providing a mirror of a vertical hinge and a single sacrificial layer.

U.S. Pat. No. 6,753,037 discloses a technology of using organic material in a sacrificial layer.

U.S. Pat. No. 6,063,696 discloses a technology of using a photoresist layer on the top surface of a mirror.

U.S. Pat. No. 6,787,187 discloses a technology of coating the top surface of a mirror with a vapor phase.

U.S. Pat. No. 6,583,920 discloses a technology of providing a sacrificial layer composed of an organic material.

U.S. Pat. No. 5,936,760 discloses a method for manufacturing a vertical hinge and a mirror.

U.S. Pat. No. 7,138,693 discloses a technology of providing a barrier layer.

U.S. Pat. No. 6,686,291 discloses a process of releasing a sacrificial layer after it is placed on a package.

U.S. Pat. No. 5,817,569 discloses a technology of configuring a groove for dicing on a device between sacrificial layers.

U.S. Pat. No. 6,958,123 discloses a technology of removing a sacrificial layer composed of an organic material by means of supercritical liquid.

U.S. Pat. No. 6,849,471 discloses a technology of providing a barrier layer.

U.S. Pat. No. 6,960,305 discloses a technology of removing a sacrificial layer by means of a material containing halogen.

U.S. Pat. No. 5,425,845 discloses a difference between etching rates caused by different additives.

U.S. Pat. No. 6,815,361 discloses a technology of preventing stiction when removing a sacrificial layer under wet conditions.

U.S. Pat. No. 7,153,443 discloses a technology of providing a barrier layer.

US Patent Application Publication 2005/0206993 discloses a technology of providing a mirror layer and a hinge layer having a multilayer structure.

SUMMARY OF THE INVENTION

The object of the present invention is to improve the manufacturing process of a mirror device, comprising a plurality of deflectable mirrors arranged in an array, in order to resolve the problems described above.

One exemplary embodiment of the present invention is a method for manufacturing a mirror device comprising deflectable mirrors supported a substrate wherein the method comprises forming a first and a second sacrificial layers on the substrate; forming a hinge encompassed in and surrounded by the first sacrificial layer and/or the second sacrificial layer with a height defined by said first and/or the second sacrificial layers; forming the deflectable mirror on top of the sacrificial layers connected to and supported on the hinge; and removing the first and second sacrificial layers to expose the hinge for deflecting the mirror to different deflection angles.

A second exemplary embodiment of the present invention is a method of manufacturing a device comprising a movable member that is held by a substrate, wherein the method comprises forming a first sacrificial layer on the substrate; forming an opening in the first sacrificial layer to expose the substrate; forming a hinge as a portion of the opening in said first sacrificial layer and supported on the substrate; forming a second sacrificial layer substantially having a planar surface on the first sacrificial layer; forming a movable member having substantially a planar surface connected to the hinge; and a removing the first and second sacrificial layers after forming the movable member by removing the second sacrificial layer for holding the hinge and the movable member after removing the first sacrificial layer.

A third exemplary embodiment of the present invention is a method for manufacturing a device comprising a movable member supported on a substrate, wherein the method comprises: forming a sacrificial layer comprising a fourth sacrificial layer comprising one or several sub-layers on the substrate; forming a hinge as a part in the fourth sacrificial layer supported on the substrate and provided to connected to the movable member; forming a movable member having substantially a planar surface over the hinge and a top surface over the fourth sacrificial layer, the movable member having a generally planar surface; forming a third sacrificial layer over the movable member after forming the movable member; and removing the fourth and third sacrificial layers encompassing and holding the hinge or the movable member in a predetermined order, after removing the third sacrificial layer.

A fourth exemplary embodiment of the present invention is a method of manufacturing a device includes an elastic member on a substrate, comprising forming a sacrificial layer on the substrate; forming a plate member substantially parallel to a surface of the substrate on the sacrificial layer; forming an elastic member between the substrate and inside the sacrificial layer; forming a holding layer to temporally hold the plate member; and removing the sacrificial layer followed by removing the holding layer after forming the plate member.

A fifth exemplary embodiment of the present invention is a manufacturing method of a device, comprising: forming a structure by forming an elastic member and a movable member on a substrate; forming a sacrificial layer on the substrate including a plurality of sacrificial sub-layers including a sacrificial sub-layer for encompassing and holding an elastic member or a movable member; and removing, in an reverse order of forming the sub-layers, the plurality of sacrificial sub-layers after forming the movable member.

A sixth exemplary embodiment of the present invention is a manufacturing method of a device, comprising: forming a structure by forming an elastic member and a movable member on a substrate; forming a sacrificial layer on the substrate by forming a plurality of sacrificial sub-layers including a sacrificial layer for encompassing and holding an elastic member or a movable member; and removing the plurality of sacrificial sub-layers after the movable member is formed, wherein the process of removing the sacrificial sub-layers comprising a step of etching the sacrificial sub-layer holding the elastic member or the movable member at a slowest etching rates among etching rates for etching the plurality of the sacrificial sub-layers.

A seventh exemplary embodiment of the present invention is a manufacturing method of a device, comprising: forming a structure by forming an elastic member and a movable member on a substrate; forming a sacrificial layer comprising a plurality of sacrificial sub-layers including a sacrificial sub-layer for encompassing and holding the elastic member or the movable member; and removing the plurality of sacrificial sub-layers after forming the movable member by removing the sacrificial sub-layer holding the elastic member or the movable member after removing other sacrificial sub-layers from among the plurality of sacrificial sub-layers.

BRIEF DESCRIPTION OF THE DRAWINGS

FIG. 5A is a top view diagram of a mirror element in a mirror device.

FIG. 5B is a cross-sectional view of the mirror element illustrated in FIG. 5A taken along the cross section A-A'.

FIG. 5C is a cross-sectional view of the mirror element illustrated in FIG. 5A taken along the cross section B-B'.

DESCRIPTION OF THE PREFERRED EMBODIMENTS

Mirror Device Configuration

Figure 1A:
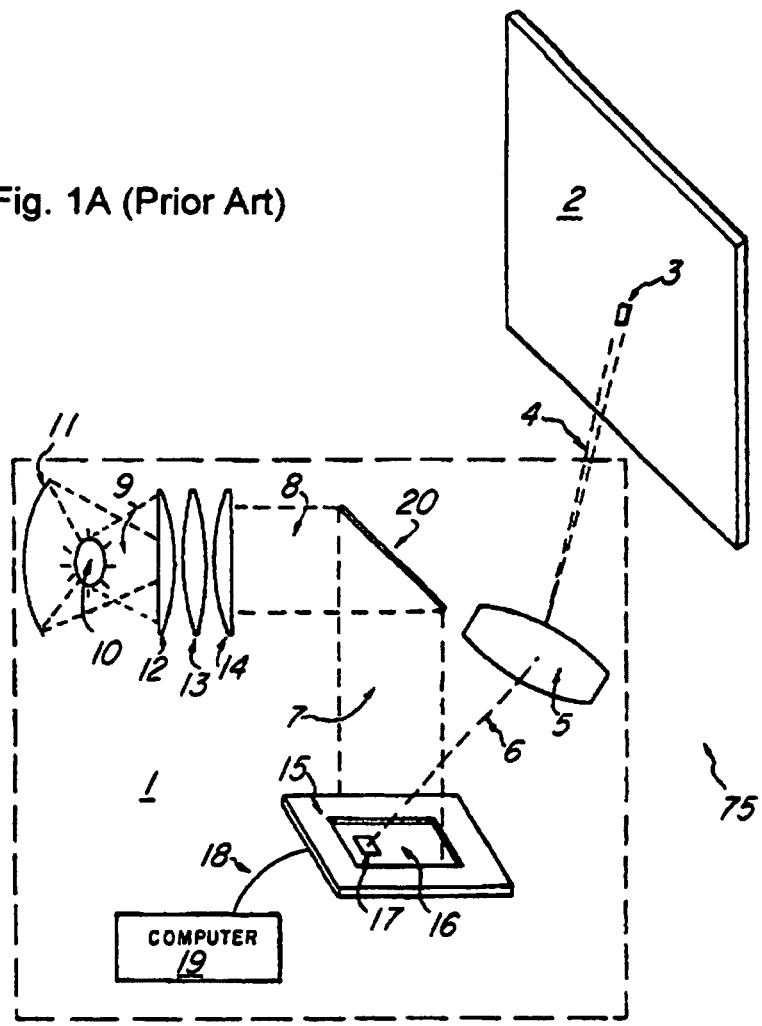
FIG. 1A shows a prior art illustrating the basic principle of a projection display using a micro-mirror device.
Figure 1B:
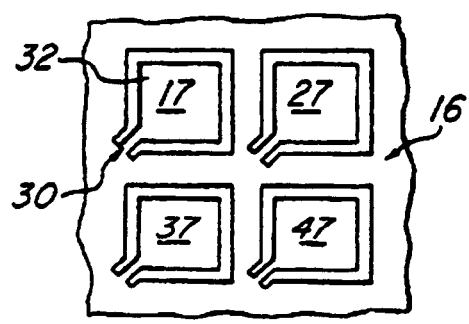
FIG. 1B shows a prior art illustrating the basic principle of a micromirror device used for a projection display.
Figure 1C:
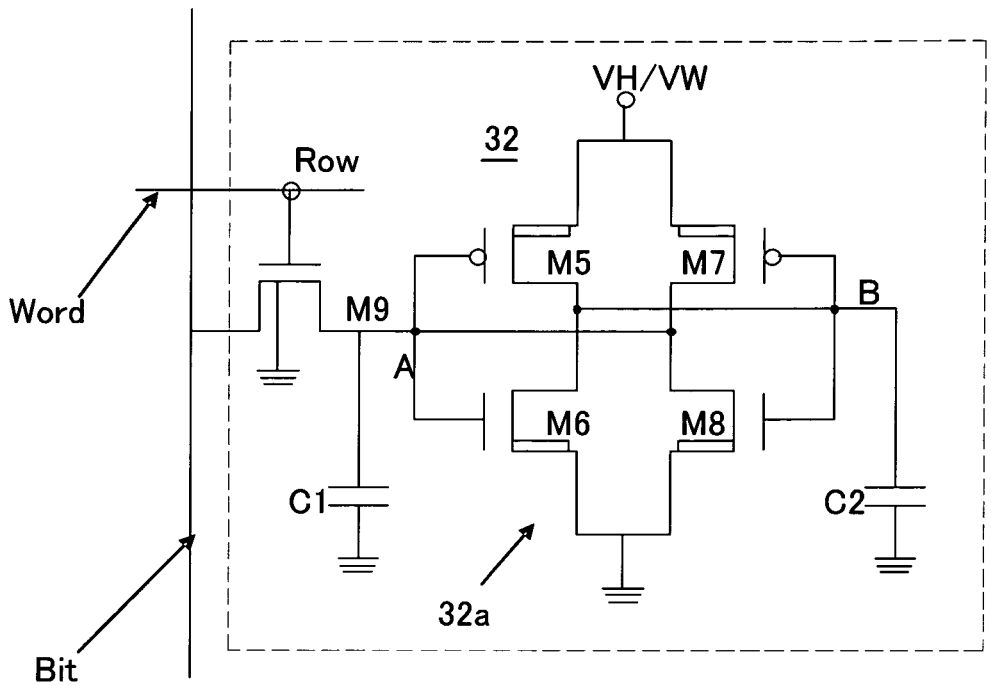
FIG. 1C shows a prior art example of a drive circuit.
Figure 1D:
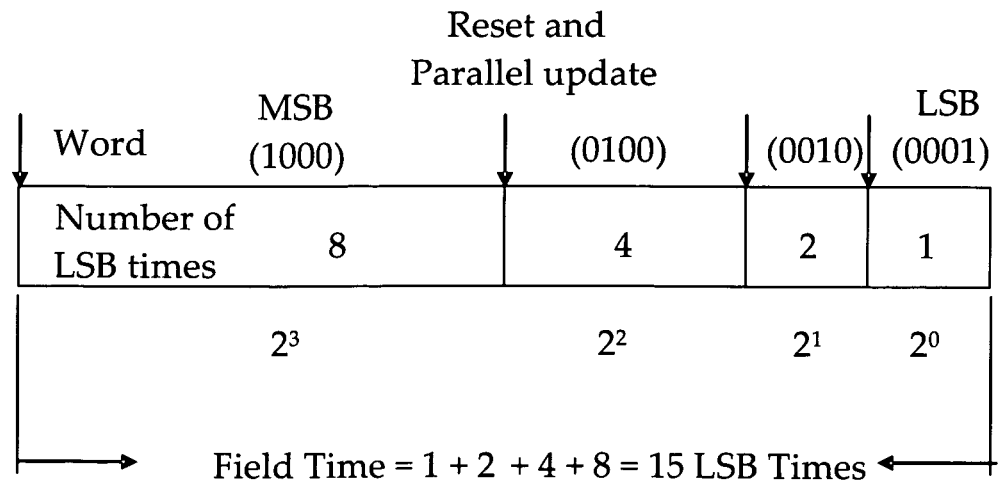
FIG. 1D shows a prior art scheme of Binary Pulse Width Modulation (Binary PWM) of a conventional digital micromirror for generating grayscale.
Figure 2:
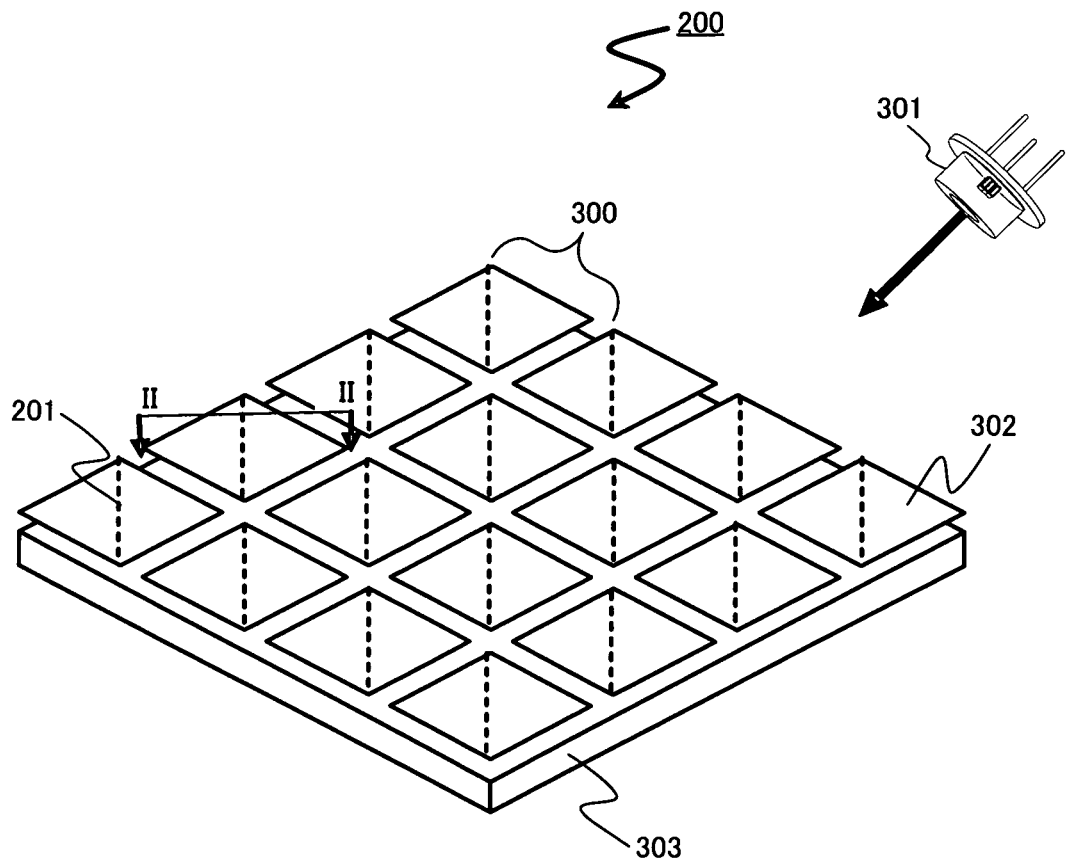
FIG. 2 is a top view diagram, showing a diagonal perspective view of a mirror device comprising a plurality of mirror elements, arranged in two-dimensions on a device substrate, that deflect mirrors to control the reflection direction of incident light.
Figure 3A:
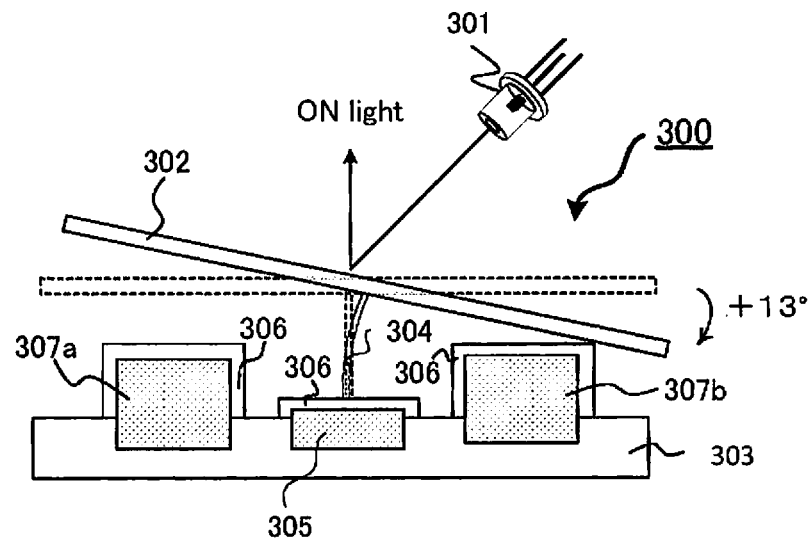
FIG. 3A is cross-sectional view of a mirror element showing a state in which a mirror is deflected to reflect incident light towards a projection optical system.
Figure 3B:
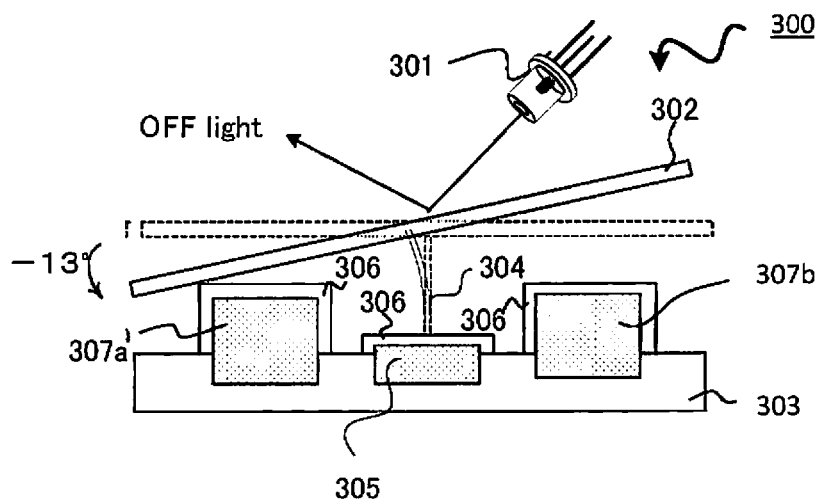
FIG. 3B is cross-sectional view of a mirror element showing a state in which a mirror is deflected so as not to reflect incident light towards a projection optical system.
Figure 4A:
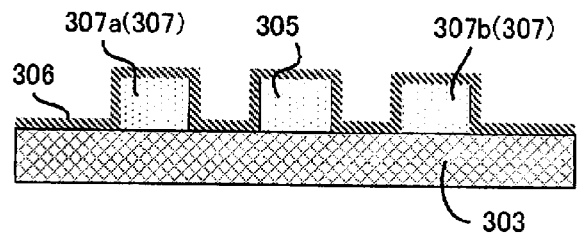
FIGS. 4A to 4F are diagrams showing a manufacturing process of a mirror device.
Figure 4B:
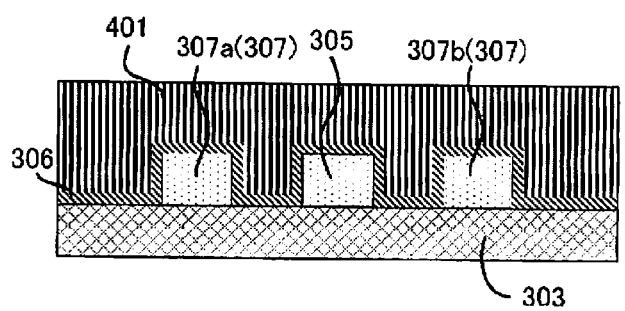
Figure 4C:
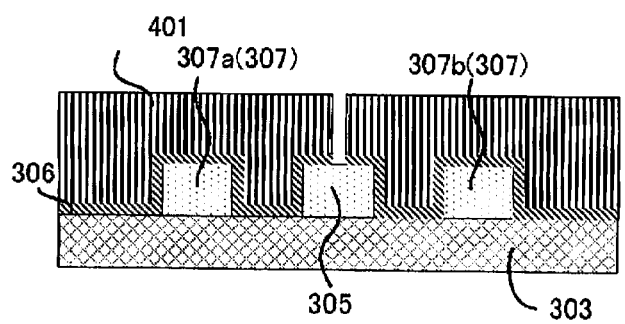
Figure 4D:
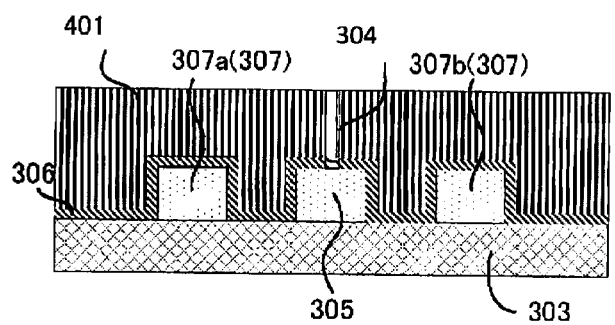
Figure 4E:
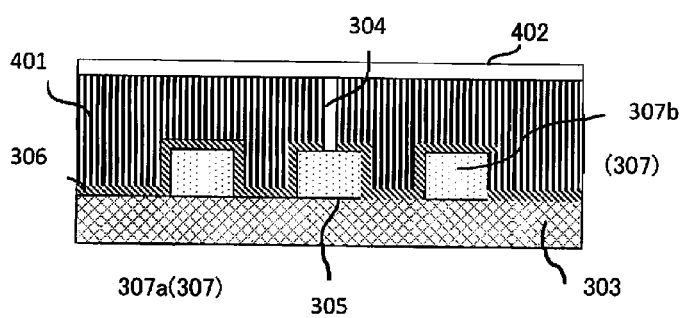
Figure 4F:
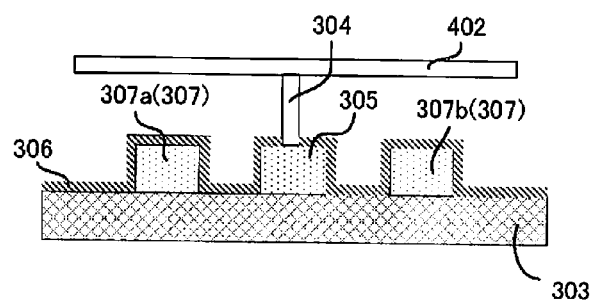

FIG. 5A is a top view diagram of a mirror element in a mirror device manufactured using the manufacturing method of the present embodiment. FIG. 5B is a cross-sectional view of the mirror element illustrated in FIG. 5A taken along cross section A-A'. FIG. 5C is a cross-sectional view of the mirror element illustrated in FIG. 5A taken along cross section B-B'. These are exemplary configurations of a mirror device.

In the mirror element shown in FIGS. 5A to 5C, a mirror 501 (i.e., plate member, movable member) composed of a highly reflective material such as aluminum, gold, or silver, is supported by an elastic hinge 502, composed of a silicon material, a metallic material, and the like, in such a way that the mirror 501 is arranged on a substrate member 503. Specifically, the silicon material may be composed of poly-silicon, single crystal silicon, amorphous silicon, or the like, and the metallic material may be composed of aluminum, titanium, their alloys or a composite material. The mirror 501 is essentially square-shaped, and one side is, for example, 4 to 11 μm long. The pitch between adjacent mirrors is, for example, 4.2 to 11.6 μm. The deflection axis 511 of the mirror 501 is diagonally positioned. The bottom end of the elastic hinge 502 is connected to the substrate member 503, comprising a circuit for driving the mirror 501. The upper end of the elastic hinge 502 is connected to the undersurface of the mirror 501. Additionally, an electrode for securing conductivity and/or an intermediate member for strengthening the member and the intensity of a connection may be positioned at the connection between the elastic hinge 502 and the substrate member 503 or between the elastic hinge 502 and the mirror 501. The intermediate member may be composed of Si, Ti, Ta, W, or the like.

In FIGS. 5A to 5C, address electrodes 504 (504a and 504b) for driving the mirror 501 and the hinge electrode 505 are positioned on the top surface of the substrate member 503 in such a way that the address electrodes 504 and the hinge electrode 505 face the undersurface of the mirror 501. The shapes of the address electrodes 504a and 504b may or may not be symmetrical about the deflection axis 511. The electrodes 504 and 505 are composed of aluminum, wolfram, or other similar material. In the present embodiment, the electrodes 504 also serve as stoppers for defining the deflection angle of the mirror. The deflection angle of the mirror is an angle determined in correspondence with the aperture ratio of a projection lens, satisfying a theoretical resolution determined from the pitch of adjacent mirrors, or is an angle at which an illumination light flux from an illumination optical system is most efficiently deflected to the projection lens. Alternately, the deflection angle of the mirror can also be larger than the angle determined in correspondence with the aperture ratio. For example, the deflection angle of the mirror may form a 10 to 13-degree angle with the horizontal state of the mirror 501, or may form a 6 to 10-degree angle with the horizontal state of a mirror 501. By configuring the electrodes 504 so that they also serve as stoppers, in comparison with a prior art in which an electrode and a stopper are arranged separately, the space for the electrodes can be maximized when decreasing the size of a mirror element.

Specifically, a widely known phenomenon known as stiction may occur, in which when the mirror 501 is deflected, it adheres to the contact surface of the mirror 501 and the electrodes 504 (stoppers) due to surface tension, intermolecular force, and the like, and then the movement of the mirror 501 is hindered. Consequently, in order to reduce the stiction phenomena of the mirror 501 and the electrodes 504, the shape of the electrodes 504 is configured to be partly convex so that they make contact with the mirror 501 at only one point, reducing the surface area in contact with the mirror 501. Specifically, FIG. 5A shows the electrodes 504A and 504B each having a horizontally and outwardly extended convex-shaped extension. Each of the convex horizontal extensions on electrodes 504A and 504B, as specifically shown as triangular-shaped convex extension in FIG. 5A, horizontally extends away from the hinge 502 with sharp-edge upper corner as that shown in FIG. 5B with significantly reduced contacting area for contacting and stopping the deflectable mirrors of the mirror device. However, if the contact force is excessively high and the causing an adverse effect of a profile irregularity of the mirror, pressure on the contact area can be adjusted by enlarging the contact area and shaping the portion of the electrodes 504 that touches the mirror 501 so that it has an angle equal to the deflection angle of the mirror 501. In the example in FIG. 5B, the electrodes 504 are in contact with the mirror 501.

When an insulating layer is provided on the surface of the electrode, it may cover only a portion of the surface includes the portion that makes contact with the mirror. FIG. 5B shows an example in which insulating layers 506 are provided for the surfaces of the substrate 503, electrodes 504 (504a and 504b), and electrode 505. The insulating layer is composed of an oxidized compound, nitride compound, silicon, or silicide, for example, SiC, $SiO_2$, $Al_2O_3$, Si, or the like. The material, film thickness, and other characteristics of the insulating layer are determined so that the withstand voltage of the insulating layer is equal to or higher than the voltage required for driving the mirror, and, most preferably, 5V or higher. The withstand voltage can be, for example, twice the drive voltage of the mirror or higher, three times or higher, or 10V or higher. If a material which has a tolerance to the etchant used in the manufacturing process is selected as an insulation material, it can also serve as a protection film that protects the electrode and substrate in the sacrificial layer etching process (in manufacturing processes described later in detail). It is preferable to use such a material since the manufacturing process can be simplified.

Manufacturing Method of a Mirror Device 1

FIGS. 6A to 6H are diagrams showing an example of the manufacturing process of a mirror device according to the present embodiment.

Figure 6A:
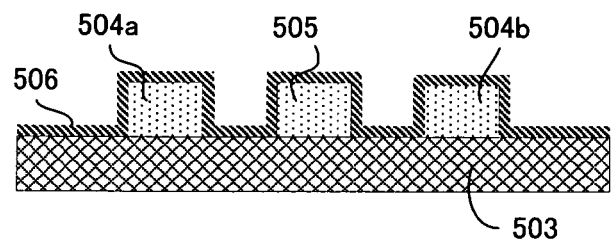
FIGS. 6A to 6H are cross-sectional views of a mirror element of a mirror device showing a manufacturing process based on the first embodiment.

First, in the process shown in FIG. 6A, a drive circuit (not shown) and wiring pattern (not shown) for controlling the drive of a mirror are formed on a semiconductor wafer substrate 503. Next, address electrodes 504 and a hinge electrode 505 connected to the drive circuit are formed. Then, the operation of the drive circuit and the conductivity of the electrodes 504 and 505 are tested for problems. When the test result indicates that there are no problems, an insulating layer 506 is formed as a protective layer on the substrate 503, address electrodes 504, and hinge electrode 505. $SiO_2$ or the like is generally used as the insulating layer 506. For example, amorphous silicon (a-Si), silicon carbide (SiC), or other similar materials, which prevent an electrical short when deflecting a mirror and the erosion of the electrodes due to etching in later processes, may be used. In addition, in order to prevent migration from occurring between aluminum forming the electrodes 504 and 505 and Si of the insulating layer 506, SiC may be formed on the surfaces of the electrodes so as to form a multilayer structure in which SiC is covered with a-Si.

Figure 6B:
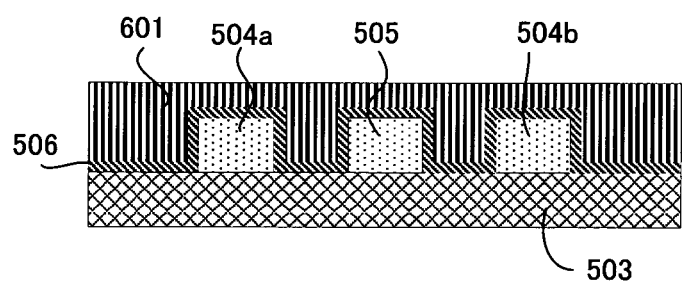

In the process shown in FIG. 6B, a first sacrificial layer 601 is deposited in such a way that it covers the electrodes on the semiconductor wafer substrate 503 formed in the process above. For example, when the insulating layer 506 of the electrodes 504 and 505 are formed using $SiO_2$ and the like, an organic material (a sacrificial material) known as photoresist may be used as the first sacrificial layer 601.

Figure 6C:
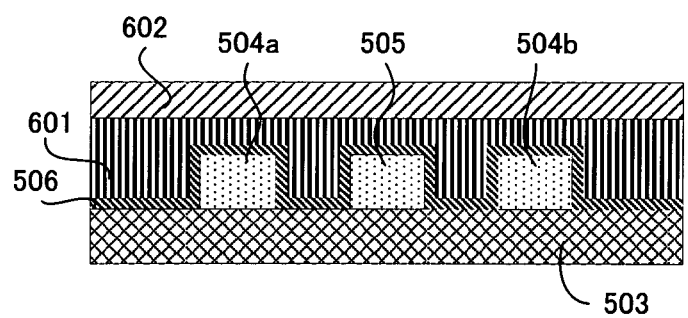

In the process shown in FIG. 6C, a second sacrificial layer 602 is deposited on the first sacrificial layer 601 formed in the process above. When photoresist is used for the first sacrificial layer 601, the second sacrificial layer 602, composed of tetraethoxysilane (TEOS) and the like, may be laminated to form a sacrificial layer made of inorganic glass. Then, the sacrificial layer is polished until it has a generally planar surface. The sacrificial layer is polished using, for example, a method called chemical mechanical planarization (CMP), in which the surface is planarized by both a chemical action and a mechanical action. The second sacrificial layer 602 is used, together with the first sacrificial layer 601, in forming the mirror surface (described later) such that there is a space between the mirror surface and the semiconductor wafer substrate 503. In the present embodiment, the thickness of the first and second sacrificial layers 601 and 602 will determine the height of an elastic hinge 604a supporting a mirror 605. The second sacrificial layer 602, according to the present embodiment, is deposited on the first sacrificial layer 601 using, for example, a method called chemical vapor deposition (CVD).

Figure 6D:
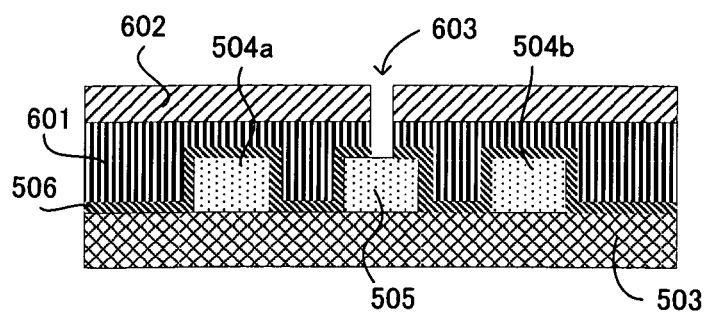

In the process shown in FIG. 6D, the first and second sacrificial layers 601 and 602 and the insulating layer 506 are partially removed by etching so that an opening 603 is formed, which determines the height and shape of the elastic hinge 604 formed in the later processes. In the present embodiment, the opening is provided in the vicinity of the center of the central electrode (the hinge electrode 505).

Figure 6E:
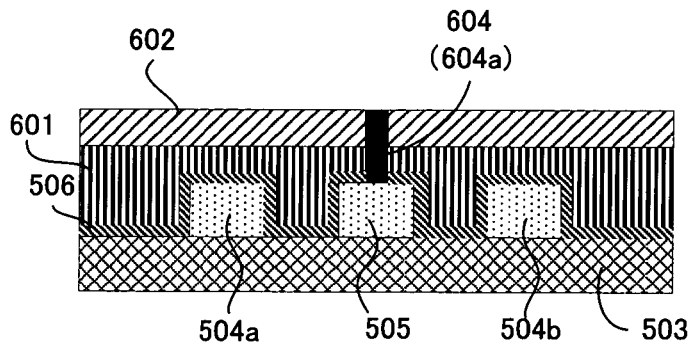

In the process shown in FIG. 6E, the elastic member 604, comprising a portion connected to the semiconductor wafer substrate 503, is deposited, filling the opening 603. Alternately, the elastic member 604 may be deposited only on the side face of the opening 603. When the elastic member 604 is deposited in the CVD, the elastic member 604 is laminated on the entire top surface of the sacrificial layer 602. However, it is removed by etching, when the elastic hinge 604 described later is formed, so as to have a desired shape.

In the present embodiment, the elastic member 604 will later form the elastic hinge 502 supporting a mirror. The elastic member 604 is composed of, for example, a silicide material such as poly-silicon or amorphous silicon (a-Si), or a metal such as aluminum, titanium, their alloys, and the like.

In this process, in order for the elastic member 604 to have the same height as the surface of the second sacrificial layer 602 and to have a top surface even with the surface of the second sacrificial layer 602, a coupled layer may be formed over the entire surface of the semiconductor wafer. This coupled layer may be composed of a metallic material such as wolfram (W) or a conductive material made by doping silicon (Si) with P, As, and/or similar materials. Then, the coupled layer may be polished so that the surface of the second sacrificial layer 602 is exposed. After that, the elastic hinge 604a is obtained by etching the elastic member 604 deposited in the opening 603 into the desired shape.

Figure 6F:
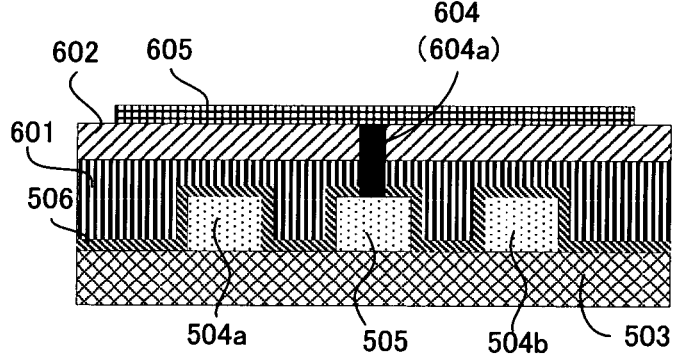

In the process shown in FIG. 6F, the mirror layer 605 (i.e., plate member, movable member) is deposited in such a way that it covers the second sacrificial layer 602 and the exposed top surface of the elastic hinge 604a. Then, photoresist (not shown) is applied to the deposited mirror layer, and the mirror layer is etched into the desired shape after a mirror pattern is exposed with a mask.

It is preferable that the mirror layer 605 be formed using material with high light reflectivity, for example, a metallic material such as aluminum. In the present embodiment, each of the mirrors is etched to be essentially square-shaped. It is desirable that one side of each of the mirrors be about 5 to 10 μm long.

In addition, in order for etchant used in the process described later to smoothly spread between the lower part of the mirror and the electrodes, the gap between the mirrors may be about 0.2 to 0.55 μm. It is also desirable that the aperture ratio, the reflective area of each of the mirror elements, be about 90%.

Next, dicing is performed to cut the semiconductor wafer substrate 503 for each mirror array. Dicing may be performed after each of the mirror shapes is formed in FIG. 6F. The sacrificial layer may be removed after the dicing.

Figure 6G:
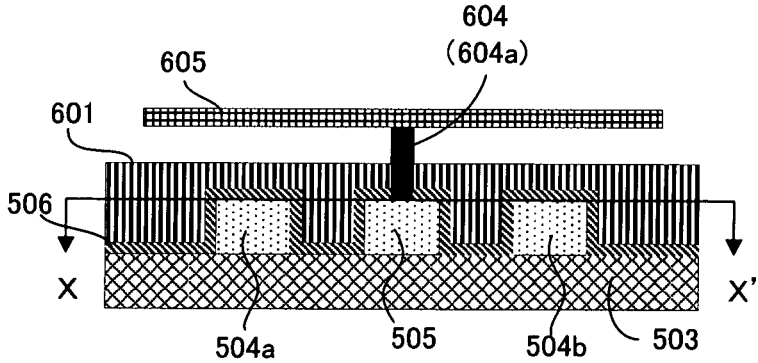
Figure 6H:
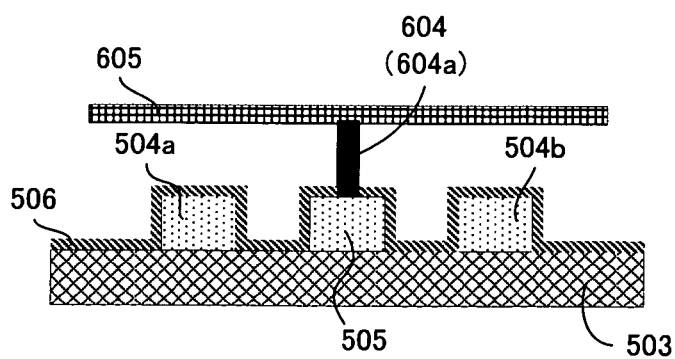

In the process shown in FIG. 6G, the second sacrificial layer 602 is removed. When the second sacrificial layer 602 is formed of glass, it is removed using hydrogen fluoride (HF) and alcohol. By adjusting the density of hydrogen fluoride (HF) and alcohol and by adjusting the processing time, the sacrificial layer can be completely removed with almost no effect from residual foreign substances and with almost no effect on the mirror elements. The effect of hydrogen fluoride (HF) on the mirror element depends on the thickness of the sacrificial layer. Therefore, in order to shorten the processing time in which the sacrificial layer is removed, it is desirable that the sacrificial layer be thin. Note that a dry-etching process may be used in removing the second sacrificial layer 602.

In the present embodiment, it is preferable that the thickness of the second sacrificial layer 602 be about 0.2 to 0.6 μm. The thickness of the first sacrificial layer 601 is about 0.4 to 0.6 μm.

In an experiment, when gaps between adjacent mirror elements were about 0.55 μm and the size of the mirrors was about 10 μm, it was confirmed that it requires about one hour of processing time to remove a sacrificial layer 1.2 μm thick by means of hydrogen fluoride (HF). Therefore, in order to shorten the processing time required for removing the sacrificial layer, so that the mirror element is not affected, it is desirable that the thickness of the sacrificial layer be half of the thickness used in the experiment (i.e., 0.6 μm).

In addition, when the protective layer (insulating layer) 506 is formed of the oxide $SiO_2$, even if hydrogen fluoride (HF) erodes the periphery of the semiconductor wafer substrate 503 and goes into the protective layer 506 during the removal of the second sacrificial layer 602, there are no problems if only a short period of time is spent on removing the second sacrificial layer.

When the protective layer 506 is formed of amorphous silicon (a-Si), there is almost no erosion caused by the etchant of hydrogen fluoride (HF) since amorphous silicon (a-Si) has a tolerance for hydrogen fluoride (HF).

Figure 7:
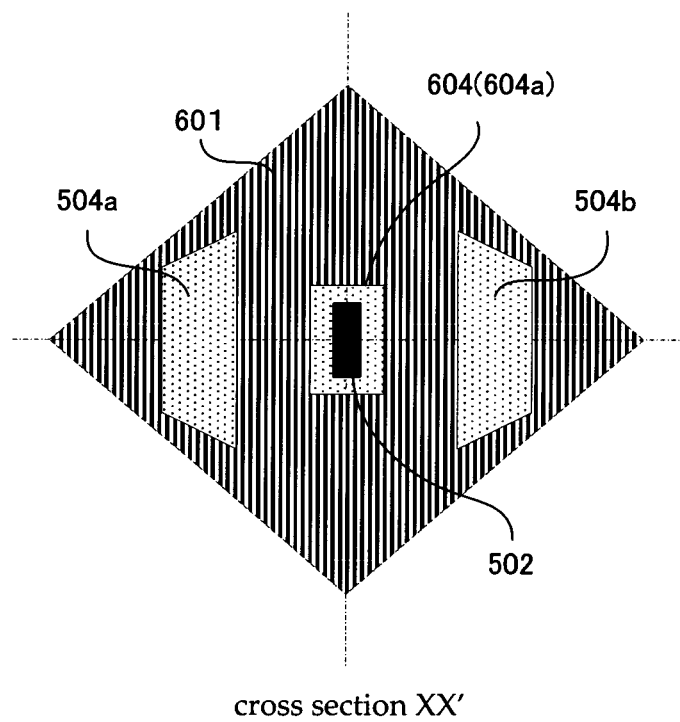
FIG. 7 is a top view diagram of a mirror element that is in the process shown in FIG. 6G viewed from under the line of the arrow XX'.

FIG. 7 is a top view diagram of the mirror element according to the process viewed from under the line of the arrow XX' in FIG. 6G; with the second sacrificial layer 602 removed. Since the first sacrificial layer 601 is still present, the elastic hinge 604a is held perpendicular to the semiconductor wafer substrate 503. As a result, it is possible to prevent the occurrence of stiction which occurs in the manufacturing process when the mirror 501 deflects and contacts the insulating layers 506 of the address electrodes 504a and 504b.

In the process shown in FIGS. 6G and H, the first sacrificial layer 601 is removed after the second sacrificial layer 602 is removed.

When the first sacrificial layer 601 is formed of photoresist, the first sacrificial layer 601 is removed by ashing, which separates the photoresist from the surface of the semiconductor wafer substrate 503. In the ashing technique, oxide can be used as an etchant. In addition, gas-phase oxide can be used to remove photoresist in a relatively short period of time. Thus, this ashing technique is dry-etching. As a result, the processing time of removing the first sacrificial layer 601 is shortened, and water is not generated. Therefore, as with the removal process of the second sacrificial layer 602, stiction can also be prevented when the mirror 605 contacts the insulating layer 506 of the address electrodes 504a and 504b in this process.

In the manufacturing process, inorganic glass layers can also be used as the first and second sacrificial layers 601 and 602. In this case, the protective layer 506 is Si and SiC, and the first sacrificial layer is $SiO_2$. The glass, made by, for example, adding some percentage of alkaline metal such as natrium (Na), lithium (Li), or kalium (K) to $SiO_2$, is used as the second sacrificial layer. As a result of this, the second sacrificial layer reacts to hydrogen fluoride (HF) as an etchant more quickly than the first sacrificial layer does; further, the region around the undersurface of the mirror, that is the most difficult to be etched, is etched first. Therefore, the total period of time to etch each of the first and second sacrificial layers is shortened, and the distortion of the hinge and the stiction between the mirror and the electrodes can be prevented in the manufacturing process.

In the manufacturing methods, such as those described above, the first and second sacrificial layers 601 and 602 are etched using an etchant corresponding to the materials selected for the layers and in such a way that the mirror 605 and elastic hinge 604a, which were protected by the layers, are deflectable. In this way, the mirror 605 and the elastic hinge 604a can be formed on the semiconductor wafer substrate 503 without the occurrence of stiction in the manufacturing process.

The next step is an anti-stiction process, in which an adherence protection layer is formed, to prevent the occurrence of the stiction at the movable parts between the mirror 501 and the electrodes 504 when the mirror is operated to be in ON and OFF states after the completion of the mirror device manufacturing process. In the anti-stiction process, it is desirable that a monolayer (an adherence protection layer) be laminated on the surfaces of the mirror 501 and electrodes 504. In addition, after the second sacrificial layer in FIG. 6G is removed, the anti-stiction process may be performed to coat the monolayer (an adherence protection layer) on the undersurface of the mirror.

Finally, the completed mirror device is enclosed in a package as a product.

In addition, a device after the dicing process is completed may be enclosed in a package. The sacrificial layer removal and anti-stiction processes may be completed before the device package is sealed.

The manufacturing methods described above are the manufacturing processes of a mirror device according to the present embodiments.

With reference to FIGS. 8A to 8G an exemplary modification of the manufacturing process of a mirror device is shown. In the manufacturing process of this exemplary modification, the sacrificial layer closer to the semiconductor wafer substrate is removed earlier than the sacrificial layer just below the undersurface of the mirror.

Figure 8A:
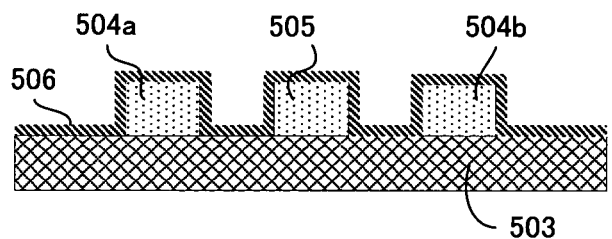
FIGS. 8A to 8G are cross-sectional views of a mirror element of a mirror device showing an exemplary modification of a manufacturing process based on the first embodiment.

The process shown in FIG. 8A is the same process as the one shown in FIG. 6A described above, and hence further descriptions will be omitted.

Figure 8B:
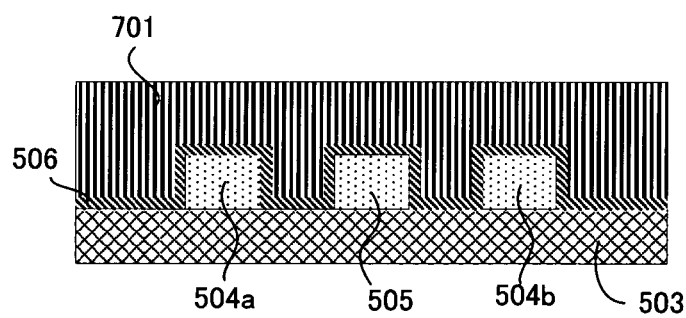

In the process shown in FIG. 8B, as with the process above shown in FIG. 6B, a first sacrificial layer 701 is deposited such that it covers the electrodes 504 and 505. When the insulating layer 506 is composed of $SiO_2$ and the like, an organic material known as photoresist may be used as the first sacrificial layer 701. The total thickness of the first sacrificial layer 701 and the second sacrificial layer 704 formed in a later process becomes the height of the elastic hinge 703.

Figure 8C:
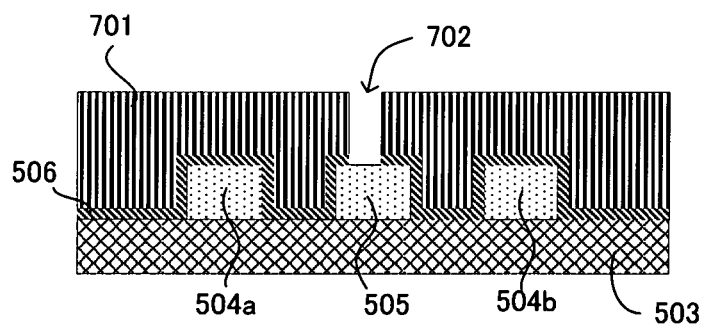

In the process shown in FIG. 8C, the first sacrificial layer 701 is partially removed by etching, so as to create an opening 702, which determines the height and shape of the elastic hinge 703 formed in the later process. In the present embodiment, the opening is provided in the vicinity of the center of the central electrode, which is the hinge electrode 505 connected to the mirror 705.

Figure 8D:
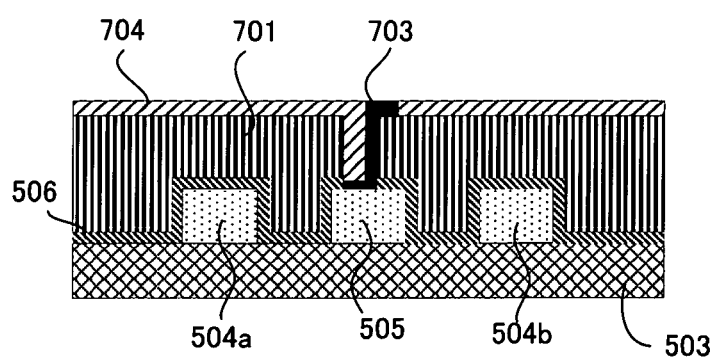

In the process shown in FIG. 8D, after a Si layer, which is the material of the elastic hinge 703, is deposited in a portion of the etched opening 702, a second sacrificial layer 704 is further deposited on the first sacrificial layer 701 formed on the semiconductor wafer substrate 503. The remaining space in the etched opening 702 is filled with the second sacrificial layer 704. After the deposited elastic hinge 703 is etched into a desired shape, the top surface of the hinge is polished until it is the same height as the second sacrificial layer 704. The top surface of the elastic hinge has a horizontal planar portion, and this portion strengthens the part that is in contact with the mirror layer 705. The total thickness of the second sacrificial layer 704 and of the first sacrificial layer 701 formed in the process above may be adjusted to be equal the height of the elastic hinge 703.

Figure 8E:
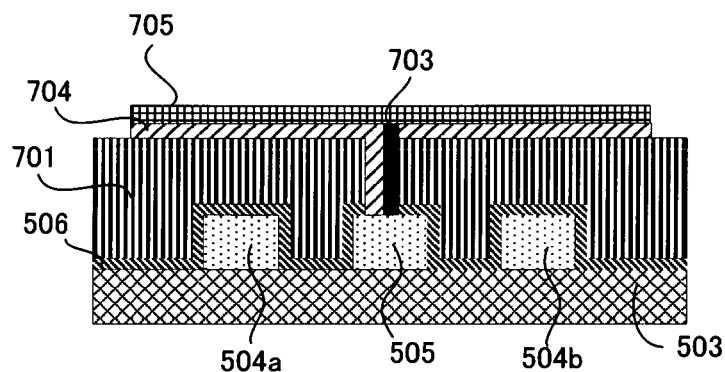

In the process shown in FIG. 8E, the mirror layer 705 (i.e., plate member, movable member) is deposited to cover the top surface of the second sacrificial layer 704 and the exposed surface of the elastic hinge 703. Then, a photoresist (not shown) is applied to the deposited mirror layer, and etching is performed to obtain a desired mirror shape after a mirror pattern is exposed using a mask. The sections of the mirror layer 705 which will become the gaps between the mirrors is removed from the second sacrificial layer 704 by etching, providing a trough later for etchant to flow into the first sacrificial layer 701.

It is preferable that the mirror layer 705 be formed using a material having a high light reflectivity, for example, a metallic material such as aluminum or silver. In the present embodiment, each of the mirrors is etched to be square-shaped. It is desirable that one side of each square mirror be about 5 to 10 μm long.

In addition, in order for the etchant used in the process described later to smoothly spread between the lower part of the mirror and the electrodes, a gap between the mirrors may be about 0.2 to 0.55 μm. It is also desirable that the aperture ratio of each of the mirror elements be about 90%.

Next, dicing is performed to cut the semiconductor wafer substrate 503 for each mirror array.

Figure 8F:
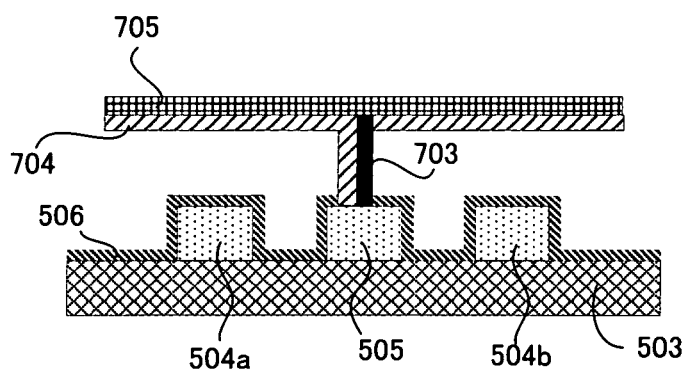

In the process shown in FIG. 8F, the first sacrificial layer 701 is removed. When the first sacrificial layer 701 is formed of photoresist, it is removed by ashing, which separates photoresist from the surface of the semiconductor wafer substrate 503. In the ashing technique, oxide can be used as an etchant. In addition, gas-phase oxide can be used to remove photoresist in a relatively short period of time. As a result, the processing time to remove the first sacrificial layer 701 is shortened, and water is not generated. Therefore, stiction can be prevented from occurring when the mirror 705 comes in contact with the insulating layer 506 of the address electrodes 504a and 504b.

When a material such as a Si material with a high bending elastic modulus is used as the elastic hinge 703, the thickness in the deflecting direction of the elastic hinge 703 is about 100 to 1000 Å or 200 to 600 Å. This elastic hinge is extremely thin. When the hinge is too thick, an extremely high voltage needs to be applied to the electrodes, and the structure of the drive circuit is extremely complicated. Particularly significant is the withstand voltage of a transistor. The width of the hinge is essentially 0.6 to 1.5 μm, and preferably 1 μm. The length between the electrode 505 and the mirror 705 is essentially 0.2 to 1.2 μm, and preferably 0.4 to 0.8 μm. In an experiment, it was confirmed that the hinge is less likely to be twisted or distorted in the manufacturing process when the length between the electrode 505 and the mirror 705 is at least shorter than the width of the elastic hinge. Therefore, when the thickness of the hinge is 1 μm or less, the width/length ratio of the hinge is preferably 1 or higher.

In this process shown in FIG. 8F, since there is still a second sacrificial layer 704 on the lower part of the mirror, the elastic hinge 703 is held perpendicular to the semiconductor wafer substrate 503. As a result, a distortion of the elastic hinge 703 can be prevented.

Figure 8G:
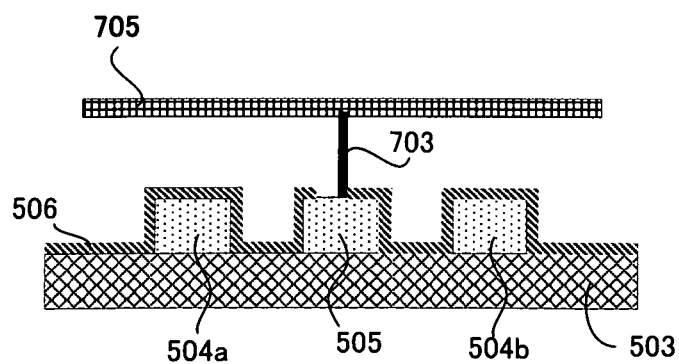

In the process shown in FIG. 8G, the second sacrificial layer 704 is removed by an appropriate etchant. When the second sacrificial layer 704 is formed of glass, it is removed using hydrogen fluoride (HF) and alcohol. Specifically, the process shown in FIG. 8G is the same process as the one shown in FIG. 6G described above, and hence further descriptions will be omitted.

Manufacturing methods such as those described above are modifications of the manufacturing process of a mirror device.

Manufacturing Method of a Mirror Device 2

What follows is another embodiment of the manufacturing method of a mirror device, in which a sacrificial layer having a multilayer structure is formed between a mirror and a semiconductor wafer substrate.

FIGS. 9A to 9I show each of the manufacturing processes of a mirror device.

Figure 9A:
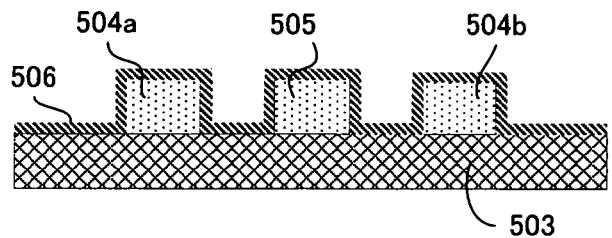
FIGS. 9A to 9I are cross-sectional views of a mirror element of a mirror device showing a manufacturing process based on the second embodiment.

First, in the process shown in FIG. 9A, a drive circuit, the electrodes 504 and 505, and the like are formed on the semiconductor wafer substrate 503. The process shown in FIG. 9A is the same process as the one shown in FIG. 6A described above, and hence further descriptions will be omitted.

Figure 9B:
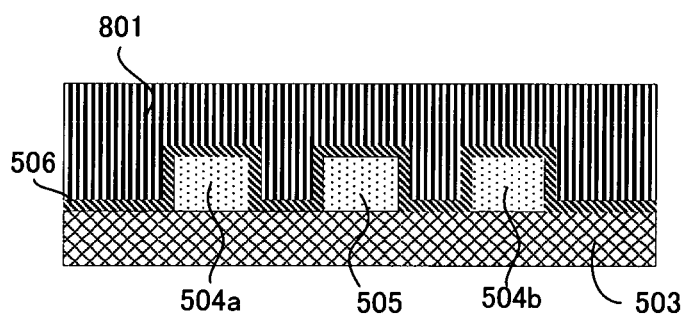

In the process shown in FIG. 9B, a first sacrificial layer 801 is deposited on the semiconductor wafer substrate 503 on which the drive circuit, the address electrodes 504a and 504b, and the hinge electrode 505 are formed. The first sacrificial layer 801 is used in order to form a space between the mirror surface and the semiconductor wafer substrate 503. The thickness of the first sacrificial layer 801 will determine the height of the elastic hinge 805 described later. When the insulating layer 506, which protects the electrodes 504 and 505 in the processes above, is composed of silicon oxide ($SiO_2$) and the like, an organic material known as photoresist may be used. When the insulating layer is silicon (Si), silicon carbide (SiC) or glass to which alkaline metal is added, such as natrium (Na), lithium (Li), or kalium (K), is used.

Figure 9C:
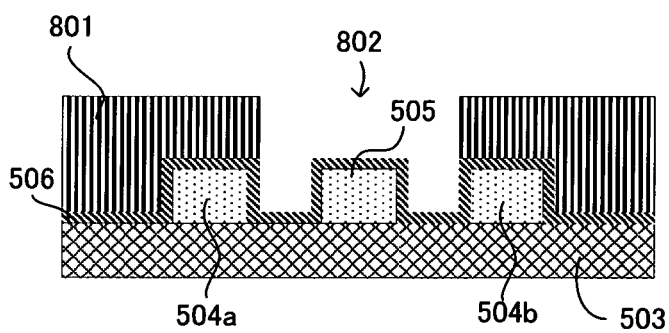

In the process shown in FIG. 9C, the first sacrificial layer 801 is removed by etching to provide a first opening 802 for forming a second sacrificial layer 803. In a later process, the mirror is supported by only the second sacrificial layer 803. In the present embodiment, it is desirable that the first opening 802 be etched in such a way that the central electrode 505 and the area adjacent to the central electrode 505 are exposed.

Figure 9D:
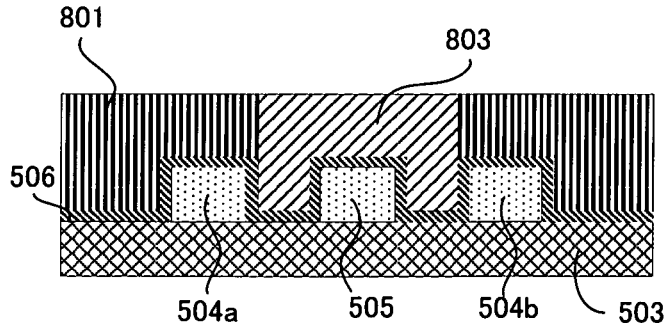

In the process shown in FIG. 9D, the second sacrificial layer 803 is deposited on the first sacrificial layer 801. The etched first opening 802 is filled with the second sacrificial layer 803. The first and second sacrificial layers 801 and 803 are polished so that their surfaces are exposed. In this case, the surface of the first sacrificial layer 801 needs to be partially flat, at least in the portion that will be in contact with the mirror. The second sacrificial layer 803 may be made by, for example, spin-coating a material such as PSG (Phospho Silicate Glass) or laminating $SiO_2$ in HDP-PECVD, or the like, using a material such as $SiH_4$ and $O_2$.

Figure 9E:
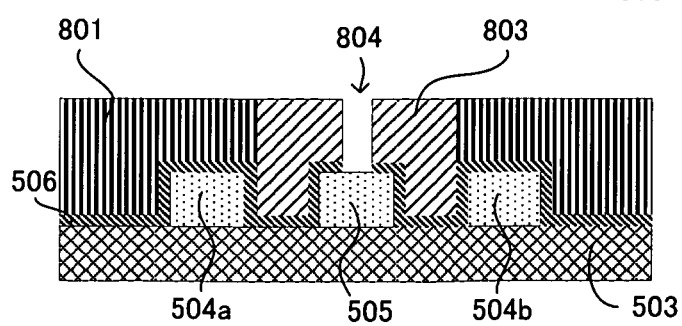

In the process shown in FIG. 9E, the deposited second sacrificial layer 803 is partially removed by etching so as to form a space for the elastic hinge 805, determining the height and shape of the elastic hinge 805. When the sacrificial layer 803 is $SiO_2$, it can be removed by performing RIE, or the like, using $C_4F_8$, CO, or the like. When the protective layer 506 is a-Si, etching can be performed using HBr, Cl, or the like. When the protective layer is SiC, etching can be performed using $CF_4$, $O_2$, or the like.

Figure 9F:
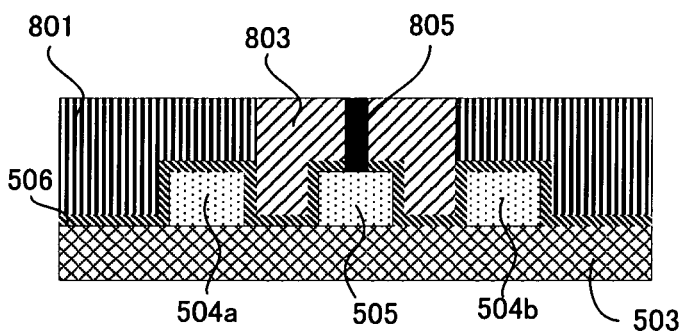

In the process shown in FIG. 9F, a material such as a-Si, that can serve as the elastic hinge 805, is laminated and deposited on the first and second sacrificial layer 801 and 803 and also laminated and deposited in part of the second opening 804. Then, the deposited elastic hinge 805 is etched into a desired shape, and the top surface of the hinge is polished until its height is the same as that of the sacrificial layers. The top surface of the elastic hinge may be just an end face of a vertical hinge or a horizontal planar-surface may be formed on top of the end-face.

Figure 9G:
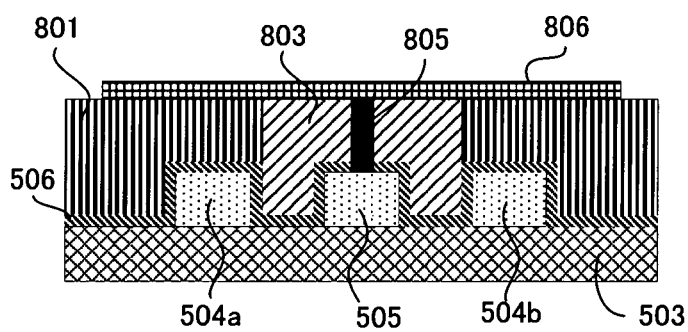

In the process shown in FIG. 9G, the mirror layer 806 (i.e., plate member, movable member) is deposited on the first and second sacrificial layers 801 and 803 and elastic hinge 805. Then, photoresist (not shown) is applied to the deposited mirror layer. After a mirror pattern is exposed using a mask, the mirror layer is etched into a desired mirror shape, and this forms the mirror 806.

It is preferable that the mirror layer 806 be formed using material having high light reflectivity, for example, a metallic material such as aluminum or silver. In the present embodiment, each of the mirrors is etched to be essentially square-shaped. It is desirable that one side of each square mirror be about 5 to 10 μm long.

In addition, in order for etchant used in the process described later to smoothly spread between the lower part of the mirror and the electrodes, a gap between the mirrors may be about 0.2 to 0.55 μm. In that case, it is desirable that the aperture ratio of each of the mirror elements be about 90%.

After that, dicing is performed to cut the semiconductor wafer substrate 503 for each mirror array.

Figure 9H:
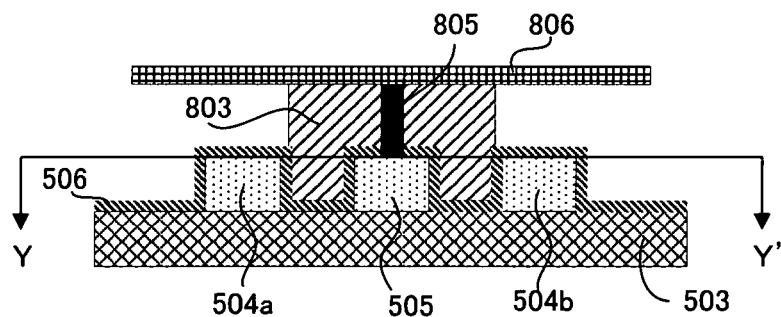

In the process shown in FIG. 9H, when the first sacrificial layer 801 is composed of photoresist, the first sacrificial layer 801 is removed with the ashing technique. In the ashing technique, using oxide as an etchant, photoresist can be separated from the surface of the semiconductor wafer substrate 503 in a relatively short period of time.

Figure 10:
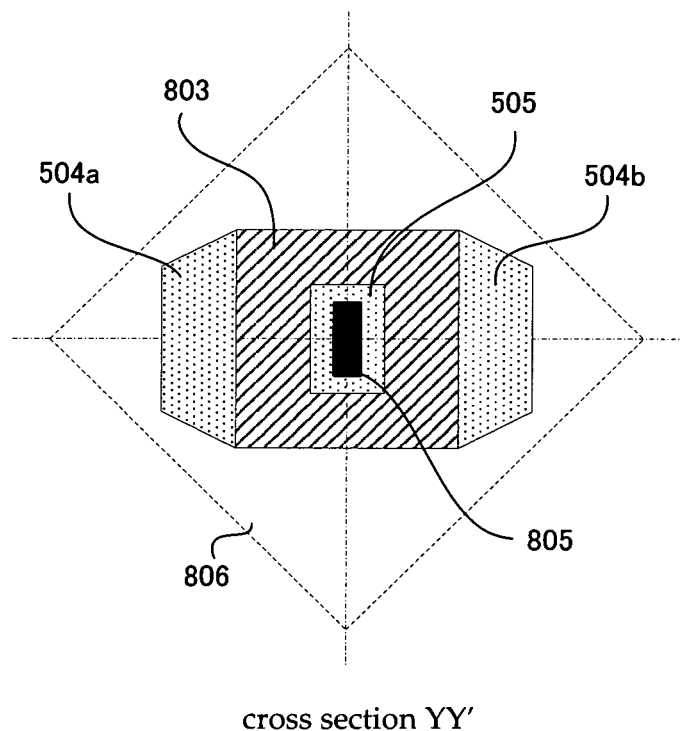
FIG. 10 is a top view diagram of the mirror element that is in the process shown in FIG. 9H viewed from under the line of the arrow YY'.

FIG. 10 is a top view diagram of the mirror element according to the process in FIG. 9H, as viewed from under the line of the arrow YY'. The elastic hinge 805 is supported by the second sacrificial layer 803.

In FIG. 9H, when the first sacrificial layer 801 is composed of glass, hydrogen fluoride (HF) is used as an etchant. In this case, since there is a difference in etching rates between the first and second sacrificial layers 801 and 803, the second sacrificial layer 803 may not have a cube shape, as that which is illustrated in FIG. 10. However, there are no problems as long as the elastic hinge 805 is entirely or partially covered with the second sacrificial layer 803.

Figure 9I:
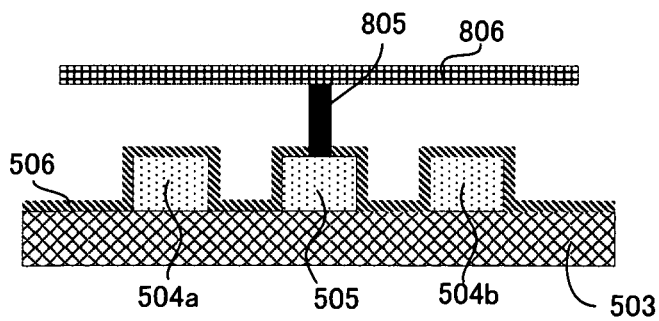

In the process shown in FIG. 9I, the second sacrificial layer 803 is removed in a relatively short time to enable the elastic hinge 805 and mirror 806, which were protected by the second sacrificial layer 803, to be deflected.

When the second sacrificial layer 803 is formed of $SiO_2$, it is removed using hydrogen fluoride (HF) and alcohol. By adjusting the density of hydrogen fluoride (HF) and alcohol and by adjusting the processing time, the sacrificial layer can be completely removed with almost no effects from residual foreign substance and with almost no effects on the mirror elements. As a result, as with the process of removing the first sacrificial layer (FIG. 9H), stiction can be prevented.

As described above, the mirror 806 and elastic hinge 805 formed on the semiconductor wafer substrate 503 can be deflected using the drive circuit (not shown), the address electrodes 504a and 504b, and the hinge electrode 505. Additionally, there is a dicing process of dividing a mirror device into the size to be used, a process of packaging each of the divisions of the mirror device, an anti-stiction process of preventing the movable part (mirror) from adhering to other members (mainly the electrodes and the like) and so on. However, the descriptions of these processes are omitted here.

When the second sacrificial layer 803 is formed of phosphor silicate glass (PSG) and the elastic hinge layer 805 is formed of amorphous silicon (a-Si), it is preferable that the elastic hinge layer 805 have conductivity by heating the semiconductor wafer substrate 503 and diffusing an impurity dopant such as P or As dopant ions in the elastic hinge layer 805.

In the process of forming the elastic hinge 805 composed of $SiH_4$, $O_2$, and similar materials, a glass layer composed of HDP-PECVD may be formed as the second sacrificial layer 803. The process may be performed when forming the elastic hinge with amorphous silicon (a-Si) doped with an impurity dopant such as phosphorous (P).

In addition, a layer for preventing stiction may be applied to the top surfaces of the electrodes and the undersurface of the mirror, after the first sacrificial layer is removed. This prevents the occurrence of stiction of the mirror element in the later dicing process, even when the mirror is completely released from the sacrificial layer.

In order to prevent stiction, a monolayer composed of the following materials is preferably used in the stiction-protection, or anti-stiction, layer:

PFODCS (perfluorooctyldimethylchlorosilane; $CF_3(CF_2)_5(CH_2)_2Si(CH_3)_2Cl$), PDTA (perfluorodecanoic acid; $C_{10}HF_{19}O_2$), OTS (octadecyltrichlorosilane; $CH_3(CH_2)_{17}SiCl_3$), and FDTS (perfluorodecyltrichlorosilane; $CF_3(CF_2)_7(CH_2)_2SiCl_3$), OTS (octadecyltrichlorosilan; $CH_3(CH_2)_{17}SiCl_3$), PFOTS (perfluorooctyltrichlorosilane; $CF_3(CF_2)_5(CH_2)_2SiCl_3$), UTS (undecenyltrichlorosilane; $CH_3(CH_2)_{10}SiCl_3$)

Manufacturing Method of a Mirror Device 3

The following is yet another embodiment of the manufacturing method of a mirror device, in which a sacrificial layer having a multilayer structure is formed between a mirror and a semiconductor wafer substrate.

FIGS. 11A to 11J show each of the manufacturing processes of a mirror device.

Figure 11A:
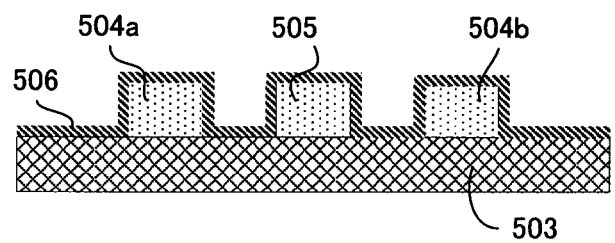
FIGS. 11A to 11J are cross-sectional views of a mirror element of a mirror device showing a manufacturing process based on the third embodiment.

First, in the process shown in FIG. 11A, a drive circuit, the electrodes 504 and 505, and the like are formed on the semiconductor wafer substrate 503. Since the process shown in FIG. 11A is the same process shown in FIG. 6A, a description is omitted here.

Figure 11B:
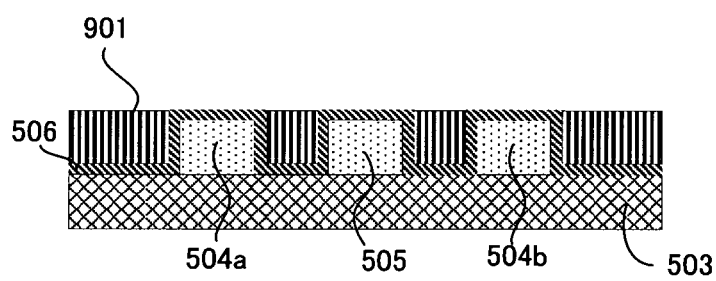

In the process shown in FIG. 11B, a first sacrificial layer 901 is deposited on the semiconductor wafer substrate 503, on which the drive circuit (not shown), address electrodes 504, and hinge electrode 505 are formed, in such a way that the first sacrificial layer 901 is as high as the protective layer 506 coating the top of the address electrodes 504 and hinge electrode 505. It is desirable that the first sacrificial layer 901 be composed of $SiO_2$. After the first sacrificial layer 901 is deposited, the top surface of the first sacrificial layer 901 may be polished by performing CMP, or the like, so that the top surface is flat.

Polishing the first sacrificial layer 901 at this stage ensures the flatness of the following sacrificial layers, mirror layer, and the like, which overlay it in later processes.

Figure 11C:
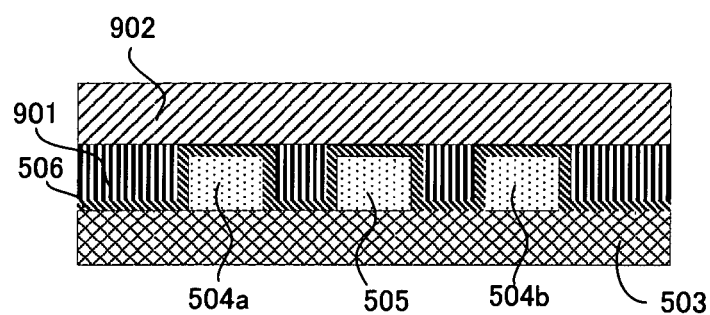

In the process shown in FIG. 11C, a second sacrificial layer 902 is deposited on the first sacrificial layer 901. The height of the second sacrificial layer 902 is used to configure, between the top surface of the hinge electrode 505 and the mirror surface, a space for the elastic hinge 904, which is formed in a later process. It is preferable that the second sacrificial layer 902 be composed of inorganic glass, to which alkaline metal is added, such as some percentage of or a small amount of natrium (Na), lithium (Li), or kalium (K). The material for the second sacrificial layer 902 preferably has a slower etching rate than the material used in first sacrificial layer 901. In the present embodiment, when the elastic hinge 904 is formed of a ceramic material, amorphous silicon (a-Si) may be used for the second sacrificial layer 902.

Figure 11D:
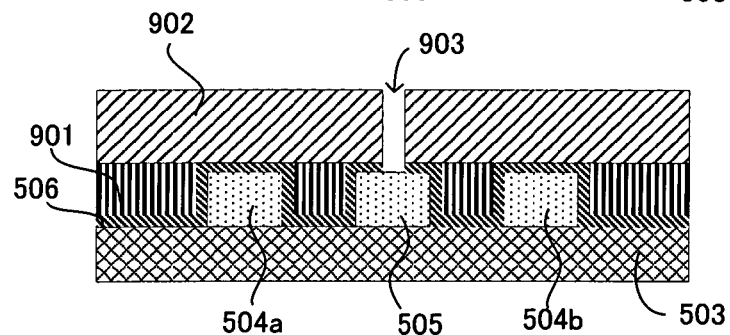

In the process shown in FIG. 11D, the second sacrificial layer 902 and the protection film 506 are removed by etching so as to create, in the vicinity of the center of hinge electrode 505, an opening 903, which determines the height and shape of the elastic hinge 904 formed in a later process. The height of the first sacrificial layer 901 is essentially the same as the height of the electrodes 504 and 505. Therefore, the process of forming an opening on the protection film 506 on the surfaces of the electrodes may be performed in the process in FIG. 11B, described above. In this case, in the process shown in FIG. 11D, only the opening on the second sacrificial layer needs to be created.

Figure 11E:
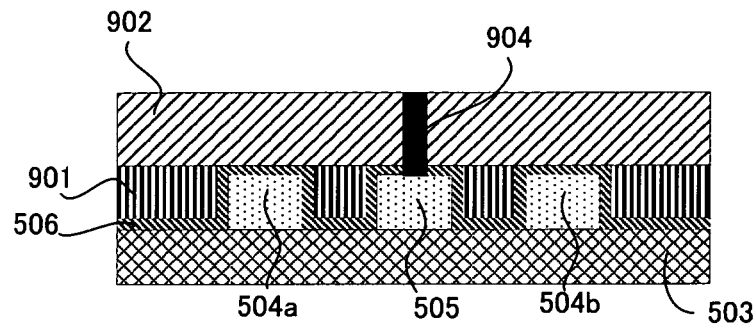

In the process shown in FIG. 11E, the material serving as the elastic hinge 904 is deposited in such a way that it fills the opening 903 or is laminated on the side of the opening. In the present embodiment, this elastic material is composed of a silicide material, such as poly-silicon (p-Si) and amorphous silicon (a-Si), or a metal, such as aluminum (Al), titanium (T), their alloys, and the like. Specifically, in order for the elastic hinge 904 to be of the same height as the surface of the second sacrificial layer 902 and to have a planar top surface, a coupled layer may be formed of a material such as wolfram (W) or a conductive material made by doping Si with P, on the top surface of the elastic member 904. Then, the coupled layer may be polished until its top surface is as high as the top surface of the second sacrificial layer 902. The elastic hinge 904 deposited in the opening 903 is etched into the desired shape.

Figure 11F:
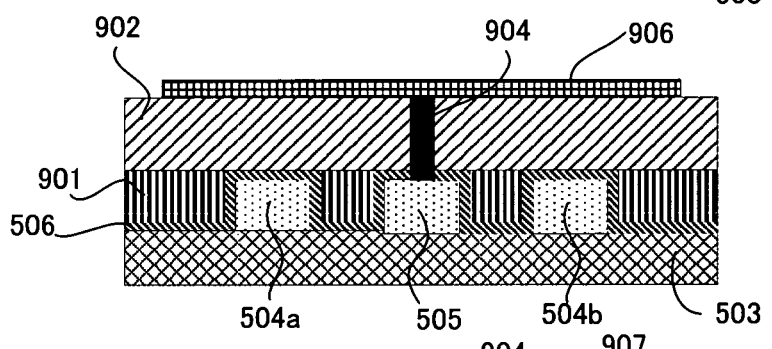

In the process shown in FIG. 11F, the mirror layer 906 (i.e., plate member, movable member) is deposited in such a way that it covers the top surfaces of the exposed second sacrificial layer 902 and elastic hinge 904. Then, photoresist (not shown) is applied to the deposited mirror layer (the plate member), and the mirror layer is etched into a desired shape after a mirror pattern is exposed using a mask.

It is preferable that the mirror layer 906 (the plate member) be formed using a material having high light reflectivity, for example, a metallic material such as aluminum or silver.

In the present embodiment, each of the mirrors is etched to be essentially square-shaped. It is desirable that one side of each square-shaped mirror be about 5 to 10 μm long.

In addition, in order for the etchant used in the process described later to smoothly spread between the lower part of the mirror and the electrodes, a gap between the mirrors may be about 0.2 to 0.55 μm. In this case, it is desirable that the aperture ratio of each of the mirror elements be about 90%.

Subsequently, the mirror device is divided in the proper size in a dicing process, undergoes an anti-stiction process of forming a protection layer to prevent the movable part (mirror) from adhering to other members (mainly the electrodes and the like), and is packaged. Each of the processes shown in FIGS. 11A to 11F is essentially the same as the other manufacturing processes described above. The main difference from these other manufacturing processes is the thickness of each of the sacrificial layers formed between the undersurface of a mirror and the semiconductor wafer substrate. In each of the processes shown in FIGS. 11A to 11F, by using a plurality of sacrificial layers corresponding to the structure on the substrate 503, a mirror device can be manufactured while maintaining the flatness of the upper surfaces of the sacrificial layers.

Figure 11G:
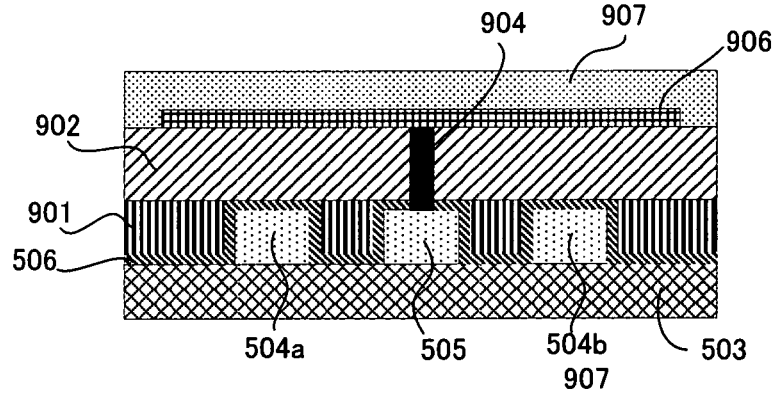

In the process shown in FIG. 11G, a third sacrificial layer 907 (a holding layer) is further deposited on the structure in such a way that it covers the mirror 906 formed on the second sacrificial layer 902. It is, for example, desirable that the third sacrificial layer 907 (the holding layer) have a tolerance to etchant composed of an organic material, such as photoresist, and a tolerance to the etchant used for the first or second sacrificial layer.

Figure 12A:
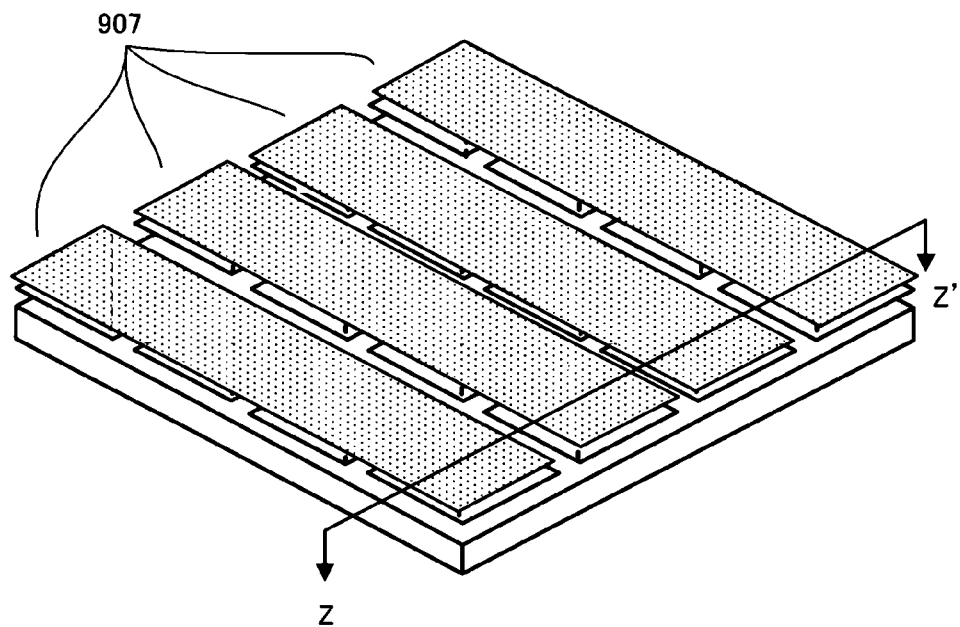
FIG. 12A is a top view diagram, showing a diagonal perspective of the mirror device that is in the process shown in FIG. 11G and comprising three sacrificial layers formed.

As shown in FIG. 12A, the third sacrificial layer 907 covers columns of adjacent mirrors, and further deposited to provide gaps between the columns. In a process described later, these gaps are used to allow for the inflow of etchant that removes the first and second sacrificial layers 901 and 902. In the third sacrificial layer 907 of the present embodiment, a bore may be opened in a region where each of the four corners of each mirror shares with its adjacent mirror element. Specifically, the bore may be opened in a portion where each of the mirrors is adjacent to each other.

Figure 11H:
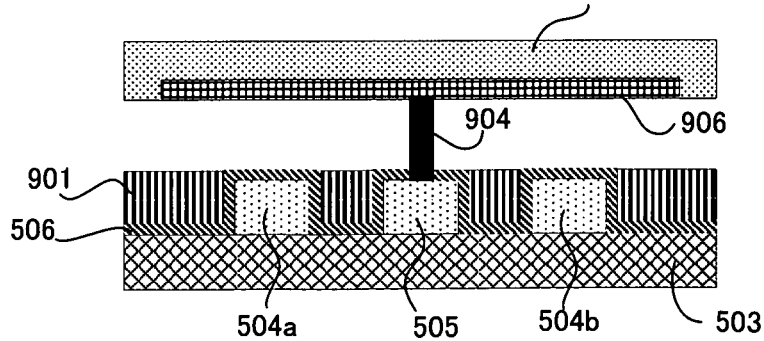
Figure 12B:
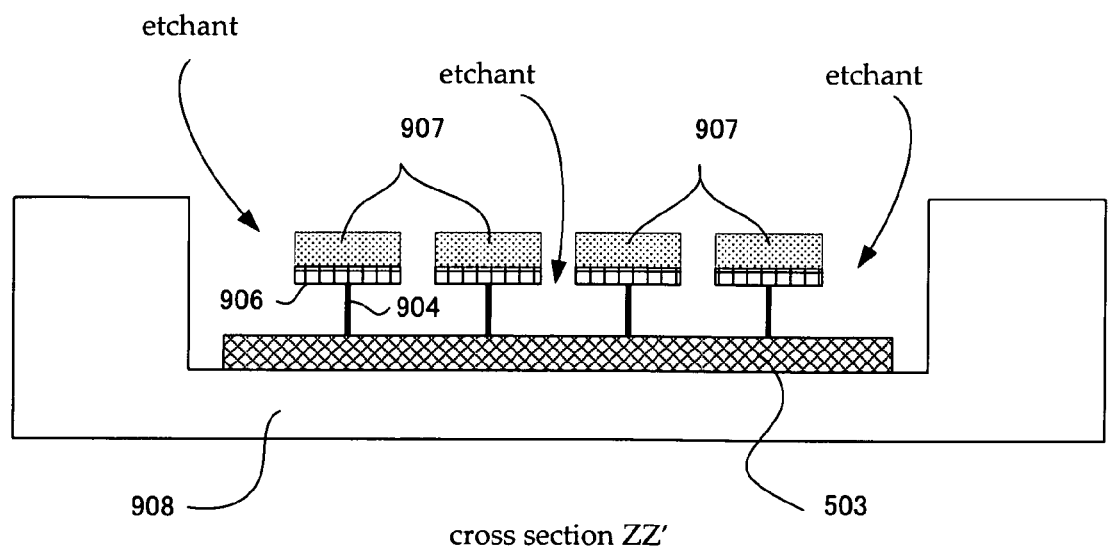
FIG. 12B is a cross-sectional view of the mirror device shown in FIG. 12A taken across the arrow Z-Z'.

In the process shown in FIG. 11H, the second sacrificial layer 902 formed on the first sacrificial layer 901 is removed. FIG. 12B shows illustrates the structure, formed on a semiconductor wafer substrate in the process above, implemented in a package 908. Etchant is infused from the opening (gaps) of the third sacrificial layer 907 formed on the second sacrificial layer 902, in order to remove each of the sacrificial layers contained in the structure.

Figure 11I:
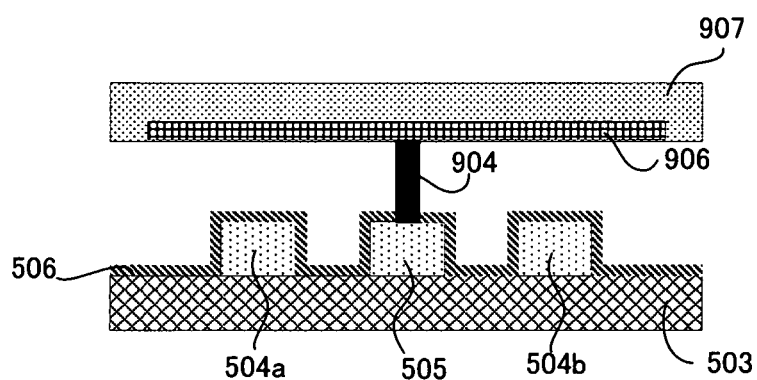

In the process shown in FIG. 11I, the first sacrificial layer 901 is removed using etchant. The first sacrificial layer 901 is removed by infusing etchant through the same gaps as those was used when the second sacrificial layer 902 was removed in the process described above.

In the processes above of removing the sacrificial layers (processes shown in FIGS. 11H and 11I), as shown in FIG. 12A, the mirror is still held by the third sacrificial layer 907 (the holding layer). Therefore, the elastic hinge 904 is not deformed, and stiction in the manufacturing process can be prevented.

Subsequently, there is a dicing process of dividing a mirror device into appropriate sizes and a process of cleaning each division of the mirror device (cleaning process). However, the descriptions of these processes are omitted here.

Figure 11J:
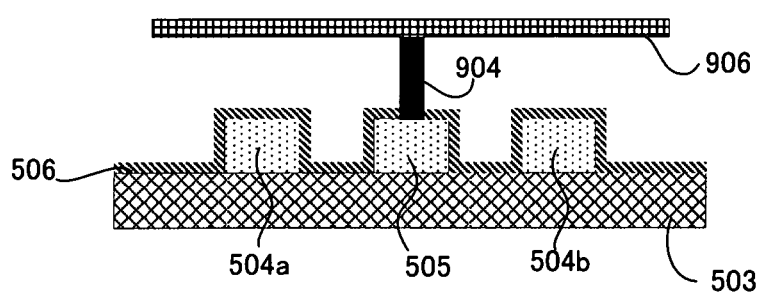

In the process shown in FIG. 11J, the third sacrificial layer 907 (the holding layer) formed on the mirror 906 is removed by ashing or other similar process. By removing the third sacrificial layer 907, the mirror 906 and elastic hinge 904, which were protected by the third sacrificial layer 907, become deflectable.

If the third sacrificial layer 907 is composed of $SiO_2$, it may contain an additive such as aluminum (AL). As a result, the acid resistance of the third sacrificial layer 907 is higher than the acid resistance of each of the first and second sacrificial layers, and this will cause differences in the removal rates of the sacrificial layers even if the same etchant is used to remove each of the sacrificial layers. Therefore, the third sacrificial layer 907 can be removed last.

Needless to say, a different etchant may be used to remove each of the sacrificial layers.

In other words, in regard to the etching reaction rate or tolerance to etchant in the materials used in each of the sacrificial layers, it is desirable that the second sacrificial layer 902 has the fastest rate (or lowest tolerance), followed by the first sacrificial layer 901 and then the third sacrificial layer 907.

In brief, as long as there are provided sacrificial layers that have different degrees of acid resistance and that have a multilayer structure and etchant can be used that does not erode an electrode or its protection film, the materials used in of each of the sacrificial layers is not limited to the ones described in the embodiment of the manufacturing process of the mirror device according to the present embodiment. In other words, the material of the third sacrificial layer may be composed of an organic material, and at least one of the materials of the fourth sacrificial layer (described below) may be composed of an inorganic material.

In addition, even though the examples are described using the first and second sacrificial layers 901 and 902, only a single sacrificial layer may be used. When the first and second sacrificial layers 901 and 902 are not distinguished from one other, the entirety of or each of these sacrificial layers is referred to as the fourth sacrificial layer. In other words, there should be no problems in the manufacturing process and the operation of the device, as long as the sacrificial layer below the mirror (i.e., fourth sacrificial layer) is removed before removing the third sacrificial layer 907 that holds each mirror surface and is positioned on the upper part of the mirror.

Although the present invention has been described in terms of the presently preferred embodiment, it is to be understood that such disclosure is not to be interpreted as limiting. Various alternations and modifications will no doubt become apparent to those skilled in the art after reading the above disclosure. The present invention may be changed in various manners possible within the scope of the present invention, and is not limited to the configurations shown in the above-described embodiments. Accordingly, it is intended that the appended claims be interpreted as covering all alternations and modifications as fall within the true spirit and scope of the invention.

What is claimed is:

1. A method for manufacturing a mirror device comprising deflectable mirrors supported on a deflectable hinge extending vertically along approximately a perpendicular direction from a substrate wherein the method comprises:
    forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;
    forming a first and a second sacrificial layers covering over the insulation layer;
    opening a vertical trench penetrating through the first sacrificial layer and the second sacrificial layer and depositing a deflectable hinge material into the vertical trench;
    forming the deflectable mirror by depositing a reflective layer directly on top of the second sacrificial layer wherein the reflective layer directly contacting a top surface of the hinge material deposited in the vertical trench; and
    removing the first and second sacrificial layers to expose the insulation layer covering the electrodes and the hinge material constituting the vertical hinge for supporting and deflecting the mirror to different deflection angles and stopped by the contacting points of the electrodes contact the deflectable mirrors.

2. The manufacturing method of a mirror device according to claim 1, wherein:
    the step of removing first and second sacrificial layers further comprises a step of forming another sacrificial layer covering the hinge or the mirror after removing at least one of the first sacrificial layer or the second sacrificial layer.

3. The manufacturing method of a mirror device according to claim 1, wherein:
    the step of forming said first and second sacrificial layers comprising a step of depositing the first sacrificial layer to cover the substrate and an electrode followed by depositing the second sacrificial layer having a planar surface over the first sacrificial layer;
    the step of removing the first and second sacrificial layers includes a process of removing the first sacrificial layer after removing the second sacrificial layer.

4. The manufacturing method of a mirror device according to claim 1, wherein:
    the step of forming the first and second sacrificial layers further comprising a step of using materials of two different compositions to form said first and second sacrificial layers.

5. The manufacturing method of a mirror device according to claim 1, wherein:
    the step of forming the first and second sacrificial layers further comprising a step of using an organic material to form the first sacrificial layer and using an inorganic material to form the second sacrificial layer.

6. The manufacturing method of a mirror device according to claim 1, wherein:
    the step of forming the first and second sacrificial layers further comprising a step of using different inorganic materials comprising different additives to form the first and second sacrificial layers.

7. The manufacturing method of a mirror device according to claim 1, wherein:
    the step of removing the first and second sacrificial layers further comprising a step of applying etching processes of different etching rates for removing the first and second sacrificial layers.

8. The manufacturing method of a mirror device according to claim 1, wherein:
    the step of removing the first and second sacrificial layers further comprising a step of applying a first etchant for removing the first sacrificial layer and a second etchant different from the first etchant for removing the second sacrificial layer.

9. The manufacturing method of a mirror device according to claim 8, wherein:
    the step of removing the first and second sacrificial layers includes a step of using an etchant composed of hydrogen fluoride or a compound of hydrogen fluoride for removing the second sacrificial layer.

10. The manufacturing method of a mirror device according to claim 8, wherein:
    the step of removing the first and second sacrificial layers further includes a step of applying a dry-etching process for removing the first sacrificial layer by performing a plasma etching process.

11. The manufacturing method of a mirror device according to claim 1, wherein:
    the step of removing the first and second sacrificial layers further includes a step of forming an adherence protection layer on the mirror or covering the insulation layer after removing one of the sacrificial layers.

12. The manufacturing method of a mirror device according to claim 1, wherein:
    the step of forming the first and second sacrificial layers further includes a step of opening a cavity in the first sacrificial layer for exposing the insulation layer covering over the substrate, and filing the cavity with the second sacrificial layer;
    the step of opening the vertical trench further includes a step of opening the vertical trench in the second sacrificial layer and penetrates through the insulation layer to the substrate followed by forming the deflectable hinge material in the vertical trench; and the step of removing the sacrificial layer further includes a process of removing the second sacrificial layer after removing the first sacrificial layer.

13. A method of manufacturing a device comprising a movable member supported on a deflectable hinge extending vertically along approximately a perpendicular direction from a substrate, wherein the method comprises:

forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;

forming a first and a second sacrificial layers covering over the insulation layer;

forming a first sacrificial layer covering over the insulation layer disposed on the substrate;

opening a cavity in the first sacrificial layer and the insulation layer exposing a top surface of the substrate;

depositing a layer of deflectable material on a vertical sidewall of the cavity opened in said first sacrificial layer wherein said layer of deflectable material having a bottom lateral portion supported on the substrate;

filling the cavity with a second sacrificial layer;

forming the movable member immediately on top of the first and second sacrificial layers and contacting a top surface of the layer of the deflectable material; and removing the first sacrificial layer followed by removing the second sacrificial layer for exposing the deflectable hinge supporting the movable member.

14. A method for manufacturing a device comprising a movable member supported on a deflectable hinge extending vertically along approximately a perpendicular direction from, a substrate, wherein the method comprises:

forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;

forming a first sacrificial layer comprising several sub-layers covering over the insulation layer;

opening a vertical trench in the first sacrificial layer and through the insulation layer and filling the vertical trench with a deflectable material having a bottom surface supported on the substrate;

forming a movable member directly on top of the first sacrificial layer with a bottom surface contacting a top surface of the deflectable material filled in the vertical trench;

forming a second sacrificial layer over the movable member; and removing the first and second sacrificial layers for exposing the deflectable material filling in the vertical trench constituting the hinge supporting the movable member supported on the hinge.

15. The method of claim 14, wherein:
the step of removing the first and second sacrificial layers comprising a step of removing the second sacrificial layer over the movable member after removing the first sacrificial layer.

16. The manufacturing method of a device according to claim 14, wherein:
the step of removing the first and second sacrificial layers comprising a step of removing at least one part of the first sacrificial layer before removing the second sacrificial layer.

17. The manufacturing method of a device according to claim 14, wherein:
the step of removing the first and second sacrificial layers comprises a step of applying a different etchant to remove each of the second and first sacrificial layers composed of a different sacrificial material.

18. The manufacturing method of a device according to claim 14, wherein:
the step of removing the first and second sacrificial layers comprises a step of etching the first sacrificial layer and the second sacrificial layer composed of a different sacrificial materials at a different etching rate.

19. The manufacturing method of a device according to claim 14, wherein:
the step of forming the first and second sacrificial layers comprises a step of forming at least one of the sacrificial layers composed of an inorganic material and adding a different additive to each of the sub-layers of the first and second sacrificial layer.

20. The manufacturing method of a device according to claim 14, wherein:
the step of forming the first and second sacrificial layers comprises a step of forming the first and second sacrificial layer with an inorganic material, and contains one of Na, Li, K, and Al as an additive.

21. The manufacturing method of a device according to claim 14, wherein:
the step of removing the first and second sacrificial layers includes a step of dry-etching the first sacrificial layer by applying a hydrogen fluoride or a compound of hydrogen fluoride.

22. The manufacturing method of a device according to claim 14, wherein:
the step of forming the first sacrificial layers comprises a step of using an organic material to form at least one of the sub-layers of the first sacrificial layer.

23. The manufacturing method of a device according to claim 14, wherein:
the step of forming the second sacrificial layer comprises a step of using an organic material to form the second sacrificial layer.

24. The manufacturing method of a device according to claim 14, wherein:
step of forming the second sacrificial layer comprises a step of using an inorganic material to form second sacrificial layer.

25. The manufacturing method of a device according to claim 14, wherein:
the step of forming the second sacrificial layer includes a step of forming an opening in the second sacrificial layer for exposing a surface of the first sacrificial layer for applying an etchant to the first sacrificial layer.

26. The manufacturing method of a device according to claim 14, wherein:
the step of forming the first sacrificial layer includes a step of opening a cavity having approximately a shape provided to form an array of movable members as a two dimensional matrix.

27. The manufacturing method of a device according to claim 14, wherein:
the step of forming the second sacrificial layer further comprises a step of a cavity in the second sacrificial layer to form each of the movable members adjacent to each other.

28. The manufacturing method of a device according to claim 14, wherein:
the step of forming the first and second sacrificial layers further includes a step of opening a cavity in the first sacrificial layer for exposing the insulation layer, and filing the cavity with the second sacrificial layer;
the step of opening the vertical trench further includes a step of opening the vertical trench in the second sacrificial layer and penetrates through the insulation layer to the substrate followed by forming the deflectable hinge material in the vertical trench; and
the step of removing the sacrificial layer further includes a process of removing the second sacrificial layer after removing the first sacrificial layer.

29. The manufacturing method of a device according to claim 28, wherein:
the step of removing the first and second sacrificial layers includes a step of includes a step of forming an adherence protection layer on the movable member after removing one of the sacrificial layers.

30. The manufacturing method of a device according to claim 28, wherein:
the step of removing the first and second sacrificial layers includes a step of removing the first sacrificial layer after removing the second sacrificial layer.

31. A method of manufacturing a device includes a vertical elastic member extending from a top surface of a substrate for supporting a plate member on top of the vertical elastic member, the method comprising:
forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;
forming a sacrificial layer covering over the insulation layer and opening a vertical trench in the sacrificial layer followed by filling the trench with an elastic material; forming a plate member directly on top of the sacrificial layer parallel to a surface of the substrate and contacting a top surface of the elastic material filled in the vertical trench and removing the sacrificial layer for exposing the elastic material filled in the trench constituting the vertical elastic member supporting the plate member.

32. The manufacturing method of a device according to claim 31, further comprising:
forming an adherence protection layer on the plate member for protecting the plate member and the step of removing the sacrificial layer further includes a step of removing the adherence protection layer.

33. The manufacturing method of a device according to claim 32, wherein:
the step of removing the adherence protection layer includes a process of dicing the substrate into a plurality of devices before removing the adherence protection layer.

34. The manufacturing method of a device according to claim 32, wherein:
the step of removing the adherence protection layer includes a process of enclosing the substrate in a package before removing the adherence protection layer.

35. A method of manufacturing a device including a vertical elastic member extending from a top surface of a substrate for supporting a movable member on top of the vertical elastic member, the method, comprising:
forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;
forming a sacrificial layer on the substrate including a plurality of sacrificial sub-layers and opening a vertical trench in the sacrificial layer followed by filling the trench with an elastic material; forming the movable member directly on top of the sacrificial layer and contacting a top surface of the elastic material filled in the vertical trench; and
removing, in an reverse order of forming the sub-layers, the plurality of sacrificial sub-layers after forming the movable member.

36. The manufacturing method of a device according to claim 35, wherein:
the step of removing the plurality of sacrificial sub-layers includes a process of removing the sacrificial sub-layer surrounding the vertical trench filled with the elastic material for exposing the elastic material filled in the trench constituting the vertical elastic member supporting the movable member.

37. A method of manufacturing a device including a vertical elastic member extending from a top surface of a substrate for supporting a movable member on top of the vertical elastic member, the method, comprising:
forming electrodes on the substrate and covering the electrodes with an insulation layer wherein the step of forming the electrodes further comprising a step of forming the electrodes having a horizontally and outwardly extended convex-shaped extension horizontally extended away from the hinge with sharp-edge upper corner with significantly reduced contacting area for contacting and stopping the deflectable mirrors of the mirror device;
forming a sacrificial layer on the substrate including a plurality of sacrificial sub-layers and opening a vertical trench in the sacrificial layer followed by filling the trench with an elastic material; forming the movable member directly on top of the sacrificial layer and contacting a top surface of the elastic material filled in the vertical trench; and
removing the plurality of sacrificial sub-layers by first etching the sacrificial sub-layer surrounding the vertical trench filled with the elastic material or the sacrificial layer contacting the movable member at a slowest etching rates among etching rates for etching the plurality of the sacrificial sub-layers.

38. The method of manufacturing a device, according to claim 1 wherein:
- the step of forming the reflective layer comprises a step of forming the reflective layer directly on top of the sacrificial layer having a length of one side of the movable member in a range substantially between 5 to 10 μm.

39. The manufacturing method of a device according to claim 37, wherein:
- the step of forming the movable member comprises a step of forming the movable member having a length of one side of the movable member in a range substantially between 5 to 10 μm.

40. The manufacturing method of a device according to claim 37, wherein:
- the step of forming the movable member comprises a step of forming the movable member having a gap substantially in a range between 0.2 to 0.55 μm between the adjacent movable members.

41. The manufacturing method of a device according to claim 37, wherein:
- the step of forming the elastic member comprises a step of forming the elastic member includes a silicon material.

42. The manufacturing method of a device according to claim 37, wherein:
- the step of forming the elastic member comprises a step of forming the elastic member having a width/length ratio greater than or equal to 1.

43. The manufacturing method of a device according to claim 37, wherein:
- the step of forming the elastic member comprises a step of forming the elastic member having a length in a range substantially between 0.3 to 1 μm.

* * * * *